US012237136B2

(12) United States Patent
Manahan et al.

(10) Patent No.: US 12,237,136 B2
(45) Date of Patent: *Feb. 25, 2025

(54) HAZARDOUS LOCATION COMPLIANT CIRCUIT PROTECTION DEVICES HAVING ENHANCED SAFETY INTELLIGENCE, SYSTEMS AND METHODS

(71) Applicant: EATON INTELLIGENT POWER LIMITED, Dublin (IE)

(72) Inventors: Joseph Michael Manahan, Manlius, NY (US); Adam Ledgerwood, Syracuse, NY (US); Andrew Butler, Baldwinsville, NY (US); Graig DeCarr, Cicero, NY (US)

(73) Assignee: EATON INTELLIGENT POWER LIMITED, Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 18/190,316

(22) Filed: Mar. 27, 2023

(65) Prior Publication Data
US 2023/0298830 A1    Sep. 21, 2023

Related U.S. Application Data

(63) Continuation of application No. 16/723,414, filed on Dec. 20, 2019, now Pat. No. 11,615,925.
(Continued)

(51) Int. Cl.
*H01H 71/02*    (2006.01)
*H01H 9/04*    (2006.01)
(Continued)

(52) U.S. Cl.
CPC .......... *H01H 9/042* (2013.01); *H01H 71/025* (2013.01); *H01H 71/10* (2013.01); *H01H 89/00* (2013.01); *H01H 2223/002* (2013.01)

(58) Field of Classification Search
CPC ........ H02H 3/006; H02H 7/226; H02H 7/228; H01H 2009/543; H01H 2009/544;
(Continued)

(56) References Cited

U.S. PATENT DOCUMENTS 3,493,783 A    2/1970 Till
3,569,820 A    3/1971 Nishimuta
(Continued)

FOREIGN PATENT DOCUMENTS

AU    502105 B2    7/1979
CA    1292553 C    11/1991
(Continued)

OTHER PUBLICATIONS

International Search Report and Written Opinion for Application No. PCT/US2019/068558 mailed Jun. 26, 2020.

*Primary Examiner* — Bryan R Perez
(74) *Attorney, Agent, or Firm* — MERCHANT & GOULD P.C.

(57) ABSTRACT

Compliant electrical circuit protection devices are described for use in hazardous environments without presenting ignition risks for potentially explosive environmental conditions. Sensing features and systems may evaluate wiring limits and user selected settings for compatibility, detect loose connections and operating parameters to ensure safe operation of the device, and to intelligently diagnose and manage issues of concern for the circuit protection devices as well as the larger electrical power system.

20 Claims, 12 Drawing Sheets

Related U.S. Application Data

(60) Provisional application No. 62/784,989, filed on Dec. 26, 2018.

(51) Int. Cl.
*H01H 71/10* (2006.01)
*H01H 89/00* (2006.01)

(58) Field of Classification Search
CPC ............. H01H 2223/002; H01H 9/042; H01H 9/0264; H01H 9/046; H01H 9/008; H01H 9/52; H01H 9/54; H01H 9/542; H01H 39/006; H01H 71/025; H01H 71/10; H01H 71/08; H01R 9/2425; F42B 3/122
See application file for complete search history.

(56) References Cited

U.S. PATENT DOCUMENTS

| | | |
|---|---|---|
| 3,644,790 A | 2/1972 | Kozlovic et al. |
| 3,656,005 A | 4/1972 | Lee |
| 3,809,985 A | 5/1974 | Krause et al. |
| 4,019,097 A | 4/1977 | Miller et al. |
| 4,115,829 A | 9/1978 | Howell |
| 4,129,785 A | 12/1978 | Kadah |
| 4,245,184 A | 1/1981 | Billings et al. |
| 4,366,463 A | 12/1982 | Barker |
| 4,599,675 A | 7/1986 | Fisher et al. |
| 4,710,645 A | 12/1987 | Doittau et al. |
| 4,713,719 A | 12/1987 | Kugelman |
| 4,740,883 A | 4/1988 | McCollum |
| 4,870,531 A | 9/1989 | Danek |
| 5,107,236 A | 4/1992 | Lesslie et al. |
| 5,140,257 A | 8/1992 | Davis |
| 5,162,610 A | 11/1992 | Clifton et al. |
| 5,434,376 A | 7/1995 | Hyatt et al. |
| 5,508,655 A | 4/1996 | Cederlind |
| 5,791,485 A | 8/1998 | Carbonneau |
| 5,818,674 A | 10/1998 | Zuzuly |
| 5,903,139 A | 5/1999 | Kompelien |
| 6,011,682 A | 1/2000 | Storey |
| 6,040,967 A | 3/2000 | DiSalvo |
| 6,051,895 A | 4/2000 | Mercie |
| 6,127,882 A | 10/2000 | Vargha et al. |
| 6,426,632 B1 | 7/2002 | Clunn |
| 6,515,840 B2 | 2/2003 | Covi et al. |
| 6,603,221 B1 | 8/2003 | Liu |
| 6,861,585 B1 | 3/2005 | Kiely |
| 7,295,410 B1 | 11/2007 | Packard et al. |
| 7,304,828 B1 | 12/2007 | Shvartsman |
| 7,323,851 B2 | 1/2008 | Markowski |
| 7,369,386 B2 | 5/2008 | Rasmussen et al. |
| 7,384,317 B1 | 6/2008 | Pijoan Parellada et al. |
| 7,436,642 B2 | 10/2008 | Grisoni |
| 7,468,877 B2 | 12/2008 | Oki et al. |
| 7,643,256 B2 | 1/2010 | Wright et al. |
| 7,656,103 B2 | 2/2010 | Shteynberg et al. |
| 7,669,061 B2 | 2/2010 | Curt et al. |
| 7,742,273 B1 | 6/2010 | Shvartsman et al. |
| 7,755,414 B2 | 7/2010 | Shvartsman |
| 7,787,223 B2 | 8/2010 | Bilac |
| 7,869,170 B2 | 1/2011 | Colsch et al. |
| 7,933,126 B2 | 4/2011 | Jain |
| 7,936,541 B2 | 5/2011 | Brusky et al. |
| 8,023,235 B2 | 9/2011 | Bilac et al. |
| 8,213,144 B2 | 7/2012 | Papallo et al. |
| 8,335,062 B2 | 12/2012 | Haines et al. |
| 8,405,939 B2 | 3/2013 | Haines et al. |
| 8,416,541 B1 | 4/2013 | White |
| 8,643,308 B2 | 2/2014 | Grajcar |
| 8,687,392 B2 | 4/2014 | Sims et al. |
| 8,779,676 B2 | 7/2014 | Simi |
| 8,853,958 B2 | 10/2014 | Athalye et al. |
| 9,000,678 B2 | 4/2015 | Huynh |
| 9,093,863 B2 | 7/2015 | Hyde et al. |
| 9,190,832 B2 | 11/2015 | Bellini et al. |
| 9,276,401 B2 | 3/2016 | Rozman et al. |
| 9,531,215 B2 | 12/2016 | Ewing et al. |
| 9,557,723 B2 | 1/2017 | Nasle |
| 9,642,226 B2 | 5/2017 | Taipale et al. |
| 9,736,911 B2 | 8/2017 | Taipale et al. |
| 9,742,185 B2 | 8/2017 | Wang et al. |
| 9,755,630 B2 | 9/2017 | Urciuoli |
| 10,079,122 B2 | 9/2018 | Kinsel et al. |
| 10,276,321 B2 | 4/2019 | Kennedy et al. |
| 10,320,177 B2 | 6/2019 | Emerson et al. |
| 10,488,528 B2 | 11/2019 | Tannce et al. |
| 10,529,521 B2 | 1/2020 | De Palma et al. |
| 11,037,749 B2 | 6/2021 | Kouroussis et al. |
| 11,270,854 B2 | 3/2022 | Manahan et al. |
| 11,615,925 B2 * | 3/2023 | Manahan ............... H02H 3/006 307/113 |
| 2001/0022713 A1 | 9/2001 | Gimenez et al. |
| 2002/0060891 A1 | 5/2002 | Buie, Jr. |
| 2003/0218847 A1 | 11/2003 | Lesesky et al. |
| 2004/0156154 A1 | 8/2004 | Lazarovich et al. |
| 2004/0217831 A1 | 11/2004 | Bauer et al. |
| 2004/0233605 A1 | 11/2004 | Dabrowski et al. |
| 2005/0270708 A1 | 12/2005 | Plemmons et al. |
| 2006/0077608 A1 | 4/2006 | Speno et al. |
| 2006/0116794 A1 | 6/2006 | Stoupis et al. |
| 2007/0236841 A1 | 10/2007 | Asano et al. |
| 2007/0255460 A1 | 11/2007 | Lopata |
| 2007/0291437 A1 | 12/2007 | Cornali et al. |
| 2008/0100140 A1 | 5/2008 | Sorenson et al. |
| 2009/0080130 A1 | 3/2009 | Hein |
| 2009/0299542 A1 | 12/2009 | Nuqui et al. |
| 2010/0131164 A1 | 5/2010 | Carter et al. |
| 2010/0159823 A1 | 6/2010 | Smith |
| 2010/0288467 A1 | 11/2010 | Manahan et al. |
| 2011/0133582 A1 | 6/2011 | Bingler |
| 2011/0163836 A1 | 7/2011 | Darr et al. |
| 2013/0066478 A1 | 3/2013 | Smith |
| 2013/0175084 A1 | 7/2013 | Taylor |
| 2014/0021898 A1 | 1/2014 | Hendrickson et al. |
| 2014/0029152 A1 | 1/2014 | Mazzola et al. |
| 2014/0034613 A1 | 2/2014 | West |
| 2014/0118875 A1 | 5/2014 | Carlino et al. |
| 2014/0211345 A1 | 7/2014 | Thompson et al. |
| 2014/0362480 A1 | 12/2014 | Veil et al. |
| 2015/0076904 A1 | 3/2015 | Mills et al. |
| 2015/0211534 A1 | 7/2015 | Volmer et al. |
| 2016/0105983 A1 | 4/2016 | Cho et al. |
| 2016/0141123 A1 | 5/2016 | Jefferies et al. |
| 2016/0225562 A1 | 8/2016 | Franks et al. |
| 2016/0276116 A1 | 9/2016 | Pignier et al. |
| 2016/0372291 A1 | 12/2016 | Darr et al. |
| 2017/0004948 A1 | 1/2017 | Leyh |
| 2017/0098931 A1 | 4/2017 | Gerdinand et al. |
| 2017/0187180 A1 | 6/2017 | Freer et al. |
| 2017/0194956 A1 | 7/2017 | Ugale et al. |
| 2017/0244246 A1 | 8/2017 | Kawamoto |
| 2017/0256934 A1 | 9/2017 | Kennedy et al. |
| 2017/0265316 A1 | 9/2017 | Grunow et al. |
| 2017/0277248 A1 | 9/2017 | Minami et al. |
| 2017/0330715 A1 | 11/2017 | von zur Muehlen et al. |
| 2017/0356639 A1 | 12/2017 | Taylor et al. |
| 2018/0069392 A1 | 3/2018 | Manahan et al. |
| 2018/0109107 A1 | 4/2018 | Mosebrook et al. |
| 2018/0138688 A1 | 5/2018 | Ukil et al. |
| 2018/0138695 A1 | 5/2018 | Wu et al. |
| 2018/0366936 A1 | 12/2018 | Kennedy et al. |
| 2019/0041887 A1 | 2/2019 | Forbes, Jr. |
| 2019/0103742 A1 | 4/2019 | Kennedy et al. |
| 2019/0164713 A1 | 5/2019 | Devine et al. |
| 2019/0198267 A1 | 6/2019 | Zhou et al. |
| 2019/0253267 A1 | 8/2019 | Ambrosino et al. |
| 2020/0035186 A1 | 1/2020 | Sasaki |
| 2020/0106259 A1 | 4/2020 | Telefus |
| 2020/0106260 A1 | 4/2020 | Telefus |
| 2020/0177072 A1 | 6/2020 | Bakovic et al. |
| 2020/0211792 A1 * | 7/2020 | Manahan ............... H01H 9/542 |

(56) References Cited

U.S. PATENT DOCUMENTS

| | | | |
|---|---|---|---|
| 2020/0212666 A1 | 7/2020 | Manahan et al. | |
| 2022/0231497 A1 | 7/2022 | Behringer et al. | |

FOREIGN PATENT DOCUMENTS

| | | |
|---|---|---|
| CA | 2162803 A1 | 5/1997 |
| CA | 2100281 C | 8/2004 |
| CA | 2310619 | 2/2005 |
| CN | 2096847 | 2/1992 |
| CN | 1156977 | 7/2004 |
| CN | 1614840 | 5/2005 |
| CN | 201937887 | 8/2011 |
| CN | 202978872 | 6/2013 |
| CN | 204732355 | 10/2015 |
| CN | 105244847 | 1/2016 |
| CN | 106206208 | 12/2016 |
| CN | 106532457 | 3/2017 |
| CN | 106549329 | 3/2017 |
| CN | 103384054 | 11/2017 |
| CN | 106169708 | 12/2017 |
| CN | 107611947 | 1/2018 |
| CN | 107731593 | 2/2018 |
| CN | 107769369 | 3/2018 |
| CN | 108630472 | 10/2018 |
| CN | 108688592 | 10/2018 |
| DE | 69818311 | 10/2003 |
| DE | 102012110001 | 4/2014 |
| EP | 0 016 646 | 10/1980 |
| EP | 0 754 369 | 1/1997 |
| EP | 1550216 | 7/2005 |
| EP | 1883830 | 11/2012 |
| EP | 2843836 | 3/2015 |
| EP | 2843837 | 3/2015 |
| EP | 3057117 | 8/2016 |
| FR | 2353130 | 12/1977 |
| FR | 2999792 | 6/2014 |
| GB | 1466313 | 3/1977 |
| GB | 1548287 | 7/1979 |
| GB | 2244876 | 12/1991 |
| IN | 217801 | 4/2008 |
| IN | 201634043598 | 7/2017 |
| JP | 2013089589 | 5/2013 |
| KR | 2010040819 | 4/2010 |
| KR | 2010044760 | 4/2010 |
| SU | 597040 | 3/1978 |
| WO | 92/03866 | 3/1992 |
| WO | 95/25384 | 9/1995 |
| WO | 02/088852 | 11/2002 |
| WO | 2011/071486 | 6/2011 |
| WO | 2016/105551 | 6/2016 |
| WO | 2017/174328 | 10/2017 |

\* cited by examiner

HAZARDOUS LOCATION COMPLIANT CIRCUIT PROTECTION DEVICES HAVING ENHANCED SAFETY INTELLIGENCE, SYSTEMS AND METHODS

CROSS REFERENCE TO RELATED APPLICATIONS

This application is a continuation of U.S. application Ser. No. 16/723,414, filed on Dec. 20, 2019, which claims the benefit of U.S. Provisional Application Ser. No. 62/784,989 filed Dec. 26, 2018, the complete disclosure of which is hereby incorporated by reference in its entirety.

BACKGROUND OF THE INVENTION

The field of the invention relates generally to circuit protection devices, and more specifically to a hazardous environment compliant circuit protection device including intelligent feedback controls to ensure enhanced safety in the proper installation and use, operational safety, and servicing of the circuit protection device in an operating electrical power system within a hazardous environment.

Various different types of circuit protection devices exist to satisfy the needs of electrical power systems providing electrical power to various electrical loads. For example, various different devices and assemblies are known that provide disconnect functionality between a power supply circuit and an electrical load. With such devices, output power may be selectively switched from a power supply either manually or automatically to facilitate service and maintenance of the electrical power system, as well as to address electrical fault conditions. Circuit breaker devices and fusible disconnect switch devices are two well-known types of devices that each provide a different capability to respond to overcurrent and electrical fault conditions and to electrically isolate load-side electrical equipment from line-side power supply circuitry, thereby protecting the load-side equipment and circuitry from otherwise damaging overcurrent conditions in the electrical power system.

While known circuit protector disconnect devices are available that satisfy the needs of many electrical systems, they remain disadvantaged in some aspects for certain types of electrical systems and applications in which the circuit protectors are located in hazardous locations. Existing circuit protector disconnect devices therefore have yet to completely meet the needs of the marketplace. Improvements are accordingly desired.

BRIEF DESCRIPTION OF THE DRAWINGS

Non-limiting and non-exhaustive embodiments are described with reference to the following Figures, wherein like reference numerals refer to like parts throughout the various drawings unless otherwise specified.

DETAILED DESCRIPTION OF THE INVENTION

Figure 1:
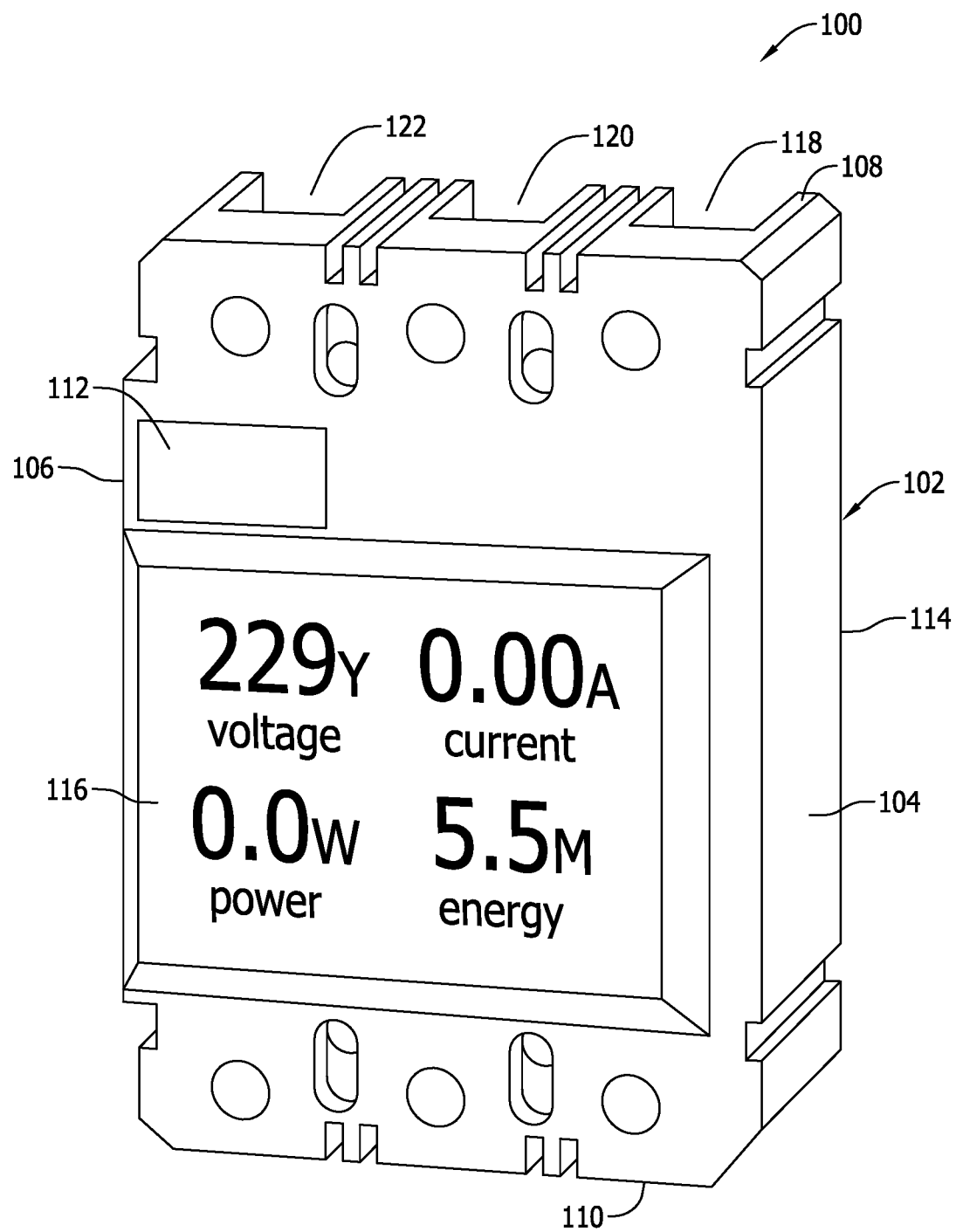
FIG. 1 is a perspective view of a compliant, hazardous location arc-less circuit protection device according to a first exemplary embodiment of the invention.

In order to understand the inventive concepts described herein to their fullest extent, set forth below is a discussion of the state of the art as it relates to issues posed by electrical power systems operating in hazardous locations, followed by exemplary embodiments of circuit protection devices, systems and methods addressing such issues and meeting longstanding but unfulfilled needs in the art.

I. State of the Art

Electrical power systems sometimes operate within hazardous environments presenting a risk of explosion via ignition of a surrounding gas or vapor dusts, fibers, or flyings. Such hazardous environments may arise in, for example only, petroleum refineries, petrochemical plants, grain silos, wastewater and/or treatment facilities, among other industrial facilities, wherein volatile conditions are produced in the ambient environment and present a heightened risk of fire or explosion. A temporary or sustained presence of airborne ignitable gas, ignitable vapors or ignitable dust, or otherwise flammable substances presents substantial concerns regarding safe and reliable operation of such facilities overall, including but not limited to safe operation of the electrical power system itself, which in some instances by virtue of conventional circuit protector devices may produce ignition sources in normal operation and in the presence of an electrical fault. As such, a number of standards have been promulgated relating to electrical product use in explosive environments to improve safety in hazardous locations in view of an assessed probability of explosion or fire risk.

For example, Underwriter's Laboratories ("UL") standard UL 1203 sets forth Explosion-Proof and Dust-Ignition-Proof Electrical Equipment criteria for hazardous locations. Explosion-Proof and Dust-Ignition-Proof enclosures are presently available to enclose or contain electrical products, including but not necessarily limited to circuit protection devices that are not themselves Explosion-Proof or Dust-Ignition-Proof. In combination with appropriate Explosion-Proof and Dust-Ignition-Proof enclosures, electrical equipment manufacturers may receive UL certification of compliance with the applicable rating standards for hazardous locations, and UL certification is an important aspect of a manufacturer's ability to successfully bring products to market in North America or any other market accepting of UL standard UL 1203.

The National Electric Code (NEC) generally classifies hazardous locations by class and division. Class 1 locations are those in which flammable vapors and gases may be present. Class II locations are those in which combustible dust may be found. Class III locations are those which are hazardous because of the presence of easily ignitable fibers or flyings. Considering Class 1, Division 1 covers locations where flammable gases or vapors may exist under normal operating conditions, under frequent repair or maintenance operations, or where breakdown or faulty operation of process equipment might also cause simultaneous failure of electrical equipment. Division 1 presents a greater risk of explosion than, for example, Division 2 where flammable gases or vapors are normally handled either in a closed system, confined within suitable enclosures, or are normally prevented by positive mechanical ventilation.

The International Electrotechnical Commission (IEC) likewise categorizes hazardous locations into Zone 0, 1, or 2 representing locations in which flammable gases or vapors are or may be airborne in an amount sufficient to produce explosive or ignitable mixtures. As defined in the IEC, a Zone 0 location is a location in which ignitable concentrations of flammable gases or vapors are present continuously or for long periods of time. A Zone 1 location is a location in which ignitable concentrations of flammable gases or vapors are likely to exist or may exist frequently because of repair or maintenance operations or because of leakage or possible release of ignitable concentrations of flammable gases or vapors, or that is adjacent to a Zone 0 location from which ignitable concentrations of vapors could be communicated.

Given that electrical devices, such as those described below, can be ignition sources in certain circumstances, explosion-proof, flame-proof, or ignition proof enclosures are conventionally provided in NEC Division 1 or 2 locations and/or IEC Zone 1 or 2 locations to house electrical devices that otherwise pose ignition risk. The terms "explosion-proof" or "flame-proof" in this context, refer to enclosures that are designed to be capable of containing an internal explosion of a specified flammable vapor-air mixture. In addition, the explosion-proof enclosure must operate at a safe temperature with respect to the surrounding atmosphere.

Conventional circuit breaker devices, switch devices of various types, and contactor devices are known to include input terminals connectable to power supply or line-side circuitry, output terminals connectable to one or more electrical loads, and pairs of mechanical switch contacts between the respective input terminals and output terminals. Each pair of mechanical switch contacts typically includes a stationary contact and a movable contact linked to an actuator element that displaces the movable contact along a predetermined path of motion toward and away from the stationary contact to connect and disconnect a circuit path through the device and therefore electrically connect or disconnect the input and output terminals. When the switch contacts are opened, the device serves to isolate the electrical load(s) connected to the output terminals from the power supply connected to the input terminals. The actuator element in the mechanical switch devices described above may be automatically movable for circuit protection purposes to open the mechanical switch contacts in response to overcurrent or fault conditions in the line-side circuit and electrically isolate the electrical load(s) from electrical fault conditions to prevent them from being damaged, or the actuator element may be manually movable to electrically isolate the electrical loads from the line-side power source for energy conservation, maintenance of the load, etc.

Circuit breakers and fusible disconnect switch devices are two well-known types of devices that each provide a different type of disconnect functionality and circuit protection via mechanical switch contacts. The IEC includes the following pertinent definitions:

2.2.11
circuit-breaker mechanical switching device, capable of making, carrying and breaking currents under normal circuit conditions and also making, carrying for a specified time and breaking currents under specified abnormal circuit conditions such as those of short circuit [441-14-20]

2.2.9
switch (mechanical)
mechanical switching device capable of making, carrying and breaking currents under normal circuit conditions which may include specified operating overload conditions and also carrying for a specified time currents under specified abnormal circuit conditions such as those of short circuit [441-14-10]
NOTE A switch may be capable of making but not breaking short-circuit currents.

2.2.1
switching device
device designed to make or break the current in one or more electric circuits [441-14-01]
NOTE A switching device may perform one or both of these operations.

It is seen from the definitions above that the circuit breaker as defined in IEC 2.2.11 and the mechanical switch as defined in IEC 2.2.9 differ in their capability to mechanically respond to abnormal circuit conditions. Specifically, the circuit breaker, as defined in IEC 2.2.11, can mechanically break short circuit conditions, whereas the mechanical switch as defined in IEC 2.2.9 cannot. Because of this, an electrical fuse is sometimes used in combination with the mechanical switch of IEC 2.2.9 to realize a fusible disconnect switch that can respond to a short circuit condition via operation of the fuse (i.e., an opening of the fuse) rather than operation of the mechanical switch contacts.

In either of the devices of IEC 2.2.11 and 2.2.9, the automatic circuit protection may sometimes be provided solely via the structural design and calibration of the circuit breaker structure or the structure of the fuse element(s) in the fuse, provided that each realizes predetermined time-current characteristics before opening of the circuit. The NEC has defined these two basic types of Overcurrent Protective Devices (OCPDs) as follows:

fuse—An overcurrent protective device with a circuit-opening fusible part that is heated and severed by the passage of overcurrent through it.
circuit breaker—A device designed to open and close a circuit by nonautomatic means and to open the circuit automatically on a predetermined overcurrent without damage to itself when properly applied within its rating.

The NEC also requires that circuits be provided with a disconnecting means, defined as a device, or group of devices, or other means by which the conductors of a circuit can be disconnected from their source of supply. Since fuses are designed to open only when subjected to an overcurrent, fuses generally are applied in conjunction with a separate disconnecting means (NEC Article 240 requires this in many situations), typically some form of a disconnect switch. Since circuit breakers are designed to open and close under manual operation, as well as in response to an overcurrent, a separate disconnecting means is not required.

In some types of circuit protection devices, automatic circuit protection may be realized via electrical sensors included in the device to monitor actual circuit conditions and, in response to predetermined circuit conditions as detected by the sensors, electromechanical trip features may be actuated to automatically open the movable contacts in response to detected overcurrent conditions including overload and short circuit conditions. Once tripped, the circuit breaker may be reset or reclosed to restore affected circuitry through the switch contacts, as the circuit breaker is designed to open the circuit without damage to itself, whereas a fuse opens a circuit via internal degradation of the fuse element(s) to the point where they can no longer carry electrical current. As such, the fuse must be replaced after opening to restore affected circuitry. Combinations of circuit breakers and fuses are also desirable in some instances, with selective coordination thereof, to extend the range of overcurrent conditions that may be addressed as well as to improve response times.

In contrast to the circuit protection devices described above, the "switching device" of IEC 2.2.1 as defined above refers merely to the making and breaking of current, without any reference to making or breaking overcurrent conditions (i.e., overload conditions or short circuit conditions). The "switching device" of IEC 2.2.1 therefore provides a disconnect function, but not a circuit protection function. IEC 2.2.1 also does not require a mechanical switching device at all, but to the extent that a switch device that is not a circuit breaker device actually includes mechanical switch contacts, it could nonetheless present an ignition risk when located in hazardous environments.

More specifically, an operation of mechanical switch contacts to make or break an energized circuit, whether manually actuated by a user under normal circuit conditions or automatically actuated under abnormal circuit conditions, presents a possible ignition source in a hazardous environment. Specifically, as the movable contacts are mechanically displaced away from stationary contacts (i.e., moved from a closed position to an opened position), electrical arcing between the switch contacts tends to result. Similar arcing may occur as the movable contacts are moved back towards the stationary contacts to reclose the device. If such arcing between the switch contacts is realized in the presence of a combustible gas, vapor or substance, the arcing may ignite the gas, vapor or substance. While the mechanical switch contacts are typically enclosed in housings provided with conventional circuit breakers or other mechanical switch devices as well as additional enclosures commonly utilized with panelboards or motor control centers, etc., such housings and enclosures are typically not sufficient to isolate electrical arcing from ignitable, airborne elements. For this reason, known devices including mechanical switch contacts are conventionally located in individual explosion-proof enclosures and again contained in an environmental enclosure, or a system of switches (i.e., a panelboard) that can in turn be installed in a single large explosion-proof enclosure without individual explosion-proof enclosures for the switches provided within an NEC Division 1 or Division 2 location, or an IEC Zone 1 or Zone 2 location to provide the necessary protection.

Of the devices described thus far, circuit breakers, while mechanically breaking a short circuit condition, experience the most intense arcing conditions and therefore have the greatest potential in terms of raw energy and temperature to ignite combustible gases, vapors or substances in a hazardous location. Considering that many industrial power systems and loads operate at relatively high voltage and high current, arc energy and arc temperatures in lower current overload conditions and normal conditions is likewise considerable and therefore poses ignition risks. In general, ignition energy resulting from the fault energy is related to the magnitude of the current being interrupted, so the higher the current being interrupted the greater the arcing potential and severity. For example, a 65 kAIC interruption is much more significant from the arcing perspective, and hence more hazardous, than a 10 kAIC interruption Available explosion-proof, flame-proof or ignition-proof enclosures are effective to provide safe operation of mechanical switch devices in an NEC Division 1 or 2 location or an IEC Zone 1 or Zone 2 location, but generally impart additional costs, occupy valuable space in the electrical power system, and impose certain burdens to the installation and servicing of an electrical power system over time. Obtaining access to the disconnect devices inside the explosion-proof enclosures typically requires a time-consuming removal of a number of fasteners, and after any maintenance procedures are completed all the fasteners must be properly replaced to ensure the desired safety of the explosion-proof enclosure. During maintenance procedures, the area in which the disconnect devices are located are also typically decommissioned (i.e., disconnected) with associated load-side processes shut down to ensure safety during the maintenance procedure. Such decommissions are costly from the perspective of the industrial facility and limiting or shortening decommissioned downtime is important. It would therefore be desirable in some cases if the explosion-proof enclosures could be eliminated in an NEC Division 1 or 2 location or an IEC Zone 1 or Zone 2 location while still providing safe disconnect functionality in hazardous environments. In order to do so, circuit protection devices designed to reduce ignition risks are needed, but at present generally do not exist.

Solid-state disconnect devices are known that provide desirable disconnect functionality via semiconductor switches or semiconductor devices such as, but not limited to, insulated-gate bipolar transistors (IGBTs), Metal Oxide Semiconductor Field Effect Transistors (MOSFETs) and other known elements that electronically operate in a known manner to preclude current flow through the device and therefor electrically isolate line-side circuitry from load-side circuitry in response to predetermined circuit conditions without utilizing mechanical switch contacts. Such solid-state switches may be implemented in circuit breaker devices or used in combination with fuses to address electrical fault conditions in an automatic manner.

Solid state switches beneficially eliminate electrical arcing associated with displacement of mechanical switch contacts as described above, but nonetheless still present possible ignition sources via heat generated by the solid state switches in use. Depending on the type and concentration of combustible elements in the hazardous location, the surface temperature of the solid state switch devices may rise to the point where spontaneous ignition may occur due to the flash temperature of the specific gas or ignitable substance in the hazardous location, even though no arcing occurs in the switching operation of the device.

Connecting terminals of solid-state switch devices may also present reliability issues and possible ignition sources when used in an NEC Division 1 or 2 location or an IEC Zone 1 or 2 location. More specifically, the terminals may tend to loosen over time when subjected to thermal cycling or vibration. Loose terminal connections may cause overheating and possible ignition sources, if not electrical arcing, at the locations of the terminals under certain operating conditions. Poor quality terminal connections may also cause overheating of the conductor structure (sometimes referred to as the bus) in the device, presenting still further ignition concerns in hazardous locations. As such, the use of known solid-state switching devices, without more, does not itself ensure sufficient safety in hazardous locations without complementary use of an explosion-proof enclosure in NEC Division 1 or 2 locations or IEC Zone 1 or 2 locations.

So-called hybrid disconnect devices are also known that include a combination of semiconductor switches or semiconductor devices and mechanical switch contacts. Such hybrid devices may likewise be implemented in circuit breaker devices or used in combination with fuses to address electrical fault conditions in an automatic manner. Hybrid disconnect devices present a mix of the issues discussed above from the perspective of possible ignition sources in a hazardous location, and adequate safety in the absence of a complementary use of an explosion-proof enclosure in an NEC Division 1 or 2 location or in an IEC Zone 1 or 2 location cannot be ensured.

II. Inventive Arc-less Devices, Systems and Methods for Hazardous Location Compliance Exemplary embodiments of circuit protection devices are described herein that overcome the problems above and that provide an enhanced degree of safety for compliance with the applicable standards in an NEC Division 1 or 2 location or an IEC Zone 1 or 2 location without necessarily requiring a separately provided explosion-proof, flame-proof or ignition-proof enclosure. As such, and by elimination of such separately provided explosion-proof, flame-proof or ignition-proof enclosure the exemplary circuit protection devices described herein beneficially reduce cost and save valuable space in electrical panels, control centers, and the like. The exemplary circuit protection devices described herein also beneficially realize a more efficient maintenance and oversight of the electrical power system. Method aspects will be in part explicitly discussed and in part apparent from the following description.

In a first aspect, exemplary circuit protection devices may be implemented in the form of a solid-state circuit protection device having arc-less operation in switching of the device to connect or disconnect load-side circuitry through the solid-state switch device, in combination with enhanced features to address possible ignition sources at the connection terminals, and/or including thermal management features to address potential overheating of conductors in the solid-state switch device. When implemented in the form of a solid-state circuit breaker device, such solid-state circuit breakers, unlike conventional circuit breakers, therefore comply with hazardous location standards applicable to NEC Division 1 or 2 locations or IEC Zone 1 or 2 locations and thus render conventional explosion-proof, flame-proof or ignition-proof enclosures obsolete for certain applications.

In a second aspect, additional safety enhancements are made via intelligent controls of a solid-state circuit protection device that detect incompatible installation and setting selection by device installers, detect inadequate or loose electrical connections to the device, and assess operating conditions of direct and indirect line-side and load-side circuitry connected through the device. The intelligent controls may adopt fail-safe measures and implement informed disconnect functionality with greater awareness of the actual state of the electrical power system and diagnosis capability to identify problematic electrical conditions and their locations relative to the device in order to ensure safe operation at the actual location of the device.

In a third aspect, a hybrid circuit protection device may be implemented in the form of a combination solid-state switching device and a mechanical switch device, and further in combination with enhanced features to isolate electrical arcing between the mechanical switch contacts from the ambient environment to prevent ignition in a hazardous location, as well as addressing possible ignition sources at the connection terminals and/or including thermal management features to avoid potential overheating of conductive elements internal to the hybrid device. Such hybrid circuit protection devices, unlike conventional hybrid circuit protection devices, therefore comply with hazardous location standards applicable to NEC Division 1 or 2 locations or IEC Zone 1 or 2 locations and render conventional explosion-proof enclosures obsolete for certain applications.

In a fourth aspect, additional safety enhancements are made via intelligent controls of a hybrid circuit protection device that detect incompatible installation and setting selection by device installers, detect inadequate or loose electrical connections to the device, and assess operating conditions of direct and indirect line-side and load-side circuitry connected through the device. The intelligent controls may adopt fail-safe measures and implement informed disconnect functionality with greater awareness of the actual state of the electrical power system and diagnosis capability to identify problematic electrical conditions and their locations relative to the device in order to ensure safe operation at the actual location of the device.

While the following discussion is made in the context of circuit breaker devices, the inventive concepts below are not necessarily limited to circuit breaker devices and instead may broadly accrue to other types of devices, examples of which are discussed above, that present similar issues from the perspective of ignition concerns in a hazardous location. Likewise, while the inventive concepts are described in the context of hazardous locations such as NEC Division 1 and 2 locations or IEC Zone 1 or 2 locations, the benefits of the concepts described are not necessarily limited to NEC Division 1 or 2 locations or IEC Zone 1 or 2 locations and instead may more broadly apply to other types of hazardous environments, and in some aspects may be beneficially provided for use in non-hazardous locations as desired.

FIG. 1 is a perspective view of a compliant, hazardous environment circuit protection device 100 according to a first exemplary embodiment of the invention. The circuit protection device 100 includes a housing 102 having opposing longitudinal sides 104, 106 and opposing lateral sides 108, 110 arranged generally orthogonally with respect to the longitudinal sides 104, 106. The housing 102 also includes a front side 112 and a rear side 114, and the front side 112 includes an optional digital display 116 that functions as an input/output element for the device 100. As shown, the display 116 visually indicates voltage, current, power and energy readings to a person in the vicinity of the device 100 and display 116.

The housing 102 of the device 100 is fabricated from strategically selected or otherwise custom formulated materials to withstand all possible electrical operating conditions, and specifically all possible electrical fault conditions including simultaneous fault conditions that may be presented by the electrical power system being protected in a NEC Division 1 or 2 or an IEC Zone 1 or 2 location.

For compliance in an NEC Division 1 location, the housing structure and housing material must likewise be further formulated to provide adequate strength to withstand shock and impact forces that may be realized in an explosive environment, as well as to provide chemical resistance to withstand exposure to chemicals in the explosive environment that could otherwise negatively impact the integrity of the device 100. As used herein, "chemical resistance" refers to the strength of the housing material to protect against chemical attack or solvent reaction. Chemical resistance in the housing 102 is the opposite of chemical reactivity that may cause an undesirable chemical effect when the housing 102 is exposed to certain chemicals and/or that my undesirably generate heat and raise the temperature of the housing 102. Chemical resistance, via little or no reactivity to specified chemicals, relates to the resistivity of the housing 102 to corrosive or caustic substances in the environment, including but not limited to airborne gases and vapors.

UL 1203 defines chemical testing that may be applied to determine whether any formulation of a candidate material for the housing 102 is chemically resistant for explosive environment locations of NEC Division 1. Specifically, UL 1203 chemical testing requires a sample housing (or sample housings) to be fabricated from the formulation of candidate material in the housing structure desired, and a lengthy exposure of the sample housings to saturated vapors in the air including a number of specified chemicals for a predetermined period of time. The specified chemicals for UL 1203 chemical testing include acetic acid, acetone, ammonium hydroxide, ASTM reference fuel C, diethyl ether, ethyl acetate, ethylene dichloride, furfural, n-hexane, methyl ethyl ketone, methanol, 2-nitropropane, and toluene. After being exposed for a predetermined period of time, inspection of the housing samples is made to ensure that the housing structure of the samples is not compromised or shows signs of degradation via, for example, discoloration, swelling, shrinking, crazing, cracking, leaching, or dissolving. Housing samples that pass inspection are then subjected to a crush test and compared to the results of crush testing prior to the chemical exposure. If the crushing force of the chemically tested housing samples shows that the chemically tested housing samples withstand at least 85% of the corresponding crush force as tested prior to the chemical exposure, the housing samples are UL 1203 compliant. Such UL 1203 compliance may be considered optional for use of the device 100 in a location that is not an NEC Division 1 location, including but not necessarily limited to NEC Division 2 or IEC Zone 1 or 2 locations and locations that do not meet the applicable standards that define hazardous areas (i.e., a non-hazardous location).

The housing 102, via the material from which it is fabricated, should likewise exhibit chemical compatibility with specific chemicals present in a given NEC Division 1 or 2 location or an IEC Zone 1 or 2 location. Chemical compatibility refers to the stability of the housing when exposed to substances in the hazardous location environment. If the housing 102 chemically reacts to a substance in the environment, it is considered incompatible. Accordingly, compatibility testing is nonetheless advisable to confirm chemical compatibility in view of the number of different corrosive or caustic chemicals and substances used across the spectrum of industrial facilities. Different facilities involving different caustic or corrosive substances may demand housings of different materials to address issues presented. Strategic selection and custom formulation of housing materials may be needed for some hazardous environments if a universally optimal housing or material formulation cannot be practically determined or economically provided. In some cases, UL 1203 compliance for the housing may obviate a need for chemical compatibility testing in selected facilities, and chemical compatibility testing may accordingly be considered optional.

The material used to fabricate the housing 102 may likewise be strategically selected or otherwise formulated, as well as formed with specific structure, to achieve thermal management and surface temperature goals for the device 100 in operation. Some housing materials may exhibit better thermal performance to distribute and dissipate heat than other materials. For example, specific polymeric resins may be selected or customized, and formulated or processed to realize a housing 102 that will improve thermal performance of the device 100 in use when protecting the electrical power system, both internally to the housing 102 and on its outer surface area such that the outer surface area temperature is maintained at a level below the temperature which could cause ignition in an NEC Division 1 or 2 location or an IEC Zone 1 or 2 location.

For any given housing material, the shape and form factor of the housing 102, including dimensions, contours, etc. may vary the overall thermal performance and surface temperature positively or negatively. For instance, for a given device rating and operating voltage and current of the electrical power system, a housing having a larger outer surface area will generally reduce surface temperature in use as compared to a housing having a smaller outer surface area. The housing structure can be designed to optimize and balance overall package size and configuration with thermal performance.

In some embodiments, the housing 102 may be fabricated from metal or metal alloys, non-metallic insulative materials such as high strength, high performance plastics, or combinations of metallic and non-metallic materials to vary thermal performance and the other considerations above, namely impact resistance and chemical resistance. Encapsulated housing constructions, in whole or in part, are likewise possible. In some instances, the interior of the housing 102 may likewise be filled in whole or in part with dielectric material, dielectric fluid, potting materials, or other filler media such as sand to contain, absorb or dissipate heat and energy of energized electrical conductors and switch components in the device 100 to unsure that the surface temperature of the housing 102 will remain below a selected target temperature to provide a device 100 having a desired temperature classification or temperature rating.

Apart from the materials utilized in its fabrication, the structure of the housing 102 could likewise be designed with heat distribution and dissipation in mind. The housing can be structured strategically to include more than one housing material throughout or at specifically targeted locations in the housing 102. Housing sub-structures could be independently fabricated and provided for assembly to provide additional thermal insulation or thermal conductivity in desired areas of the housing to selectively confine and distribute heat in a strategic manner in select locations. Wall thickness of the housing 102 could likewise be varied to provide greater or lesser degrees of thermal conductivity and heat dissipation in selected portions of the structure or in certain areas of the housing structure at the most desirable locations. Piping, channels, or pockets may be formed to strategically capture generated heat and direct it more efficiently to desired locations for dissipation. Heat sink materials and the like may be included to improve thermal absorption and dissipation.

Active cooling elements are likewise possible in which cooling fluids are passed over or through the housing structure, with the housing structure including appropriate structure to facilitate active cooling. Active cooling elements could be self-contained or separately provided such as in a panelboard application where a number of devices 100 may be provided, with an active cooling system countering the cumulative generation of heat in closely positioned devices 100 and alleviating temperature effects that the devices 100 may have upon one another.

The above thermal management considerations may be pursued in various different combinations, some of which may counteract or obviate a need for other considerations. For example, active cooling in some applications may obviate a need for certain features of the housing described, such as a more sophisticated shape and form factor to dissipate heat over a relatively complex surface area.

The lateral sides 108, 110 of the housing 102 each include connection recesses 118, 120, and 122 for respective connection to line-side and load-side circuitry. In the example shown in FIG. 1, three connection recesses 118, 120, and 122 are provided for respective connection to a three-phase power supply on one of the sides 108, 110 and to three-phase load-side equipment on the other. The power supply and load may each operate with alternating current (AC) or direct current (DC). The device 100 as shown is configured as a circuit breaker and therefore provides automatic circuit protection in response to predetermined overcurrent conditions, which may be selected by the user within a certain range and input to the device 100 via the display screen 116, via another user interface, or pre-programmed into the device. The device 100 may operate according to specified time-current curves or trip profiles suitable to provide adequate protection for connected loads.

The display 116 may be multi-functional to display different screens in response to user activation. In some embodiments the display 116 may be touch sensitive with the user making selections via touching selected areas of the display as prompted. Input selectors such as buttons, knobs, etc. may be separately supplied from the display 116 for interaction by a user in relation to the prompts and information presented on the display. Input selectors such as toggle switches may also be provided separately from the display 116 to serve as manually operable on/off switches that may intuitively be manually operated by a user. Alternatively, an on/off feature may be built into the display 116 for convenient use by an operator to achieve disconnect switch functionality to connected load-side equipment. It is recognized, however, that the display 116 can be considered optional in certain embodiments and need not be included at all.

Figure 2:
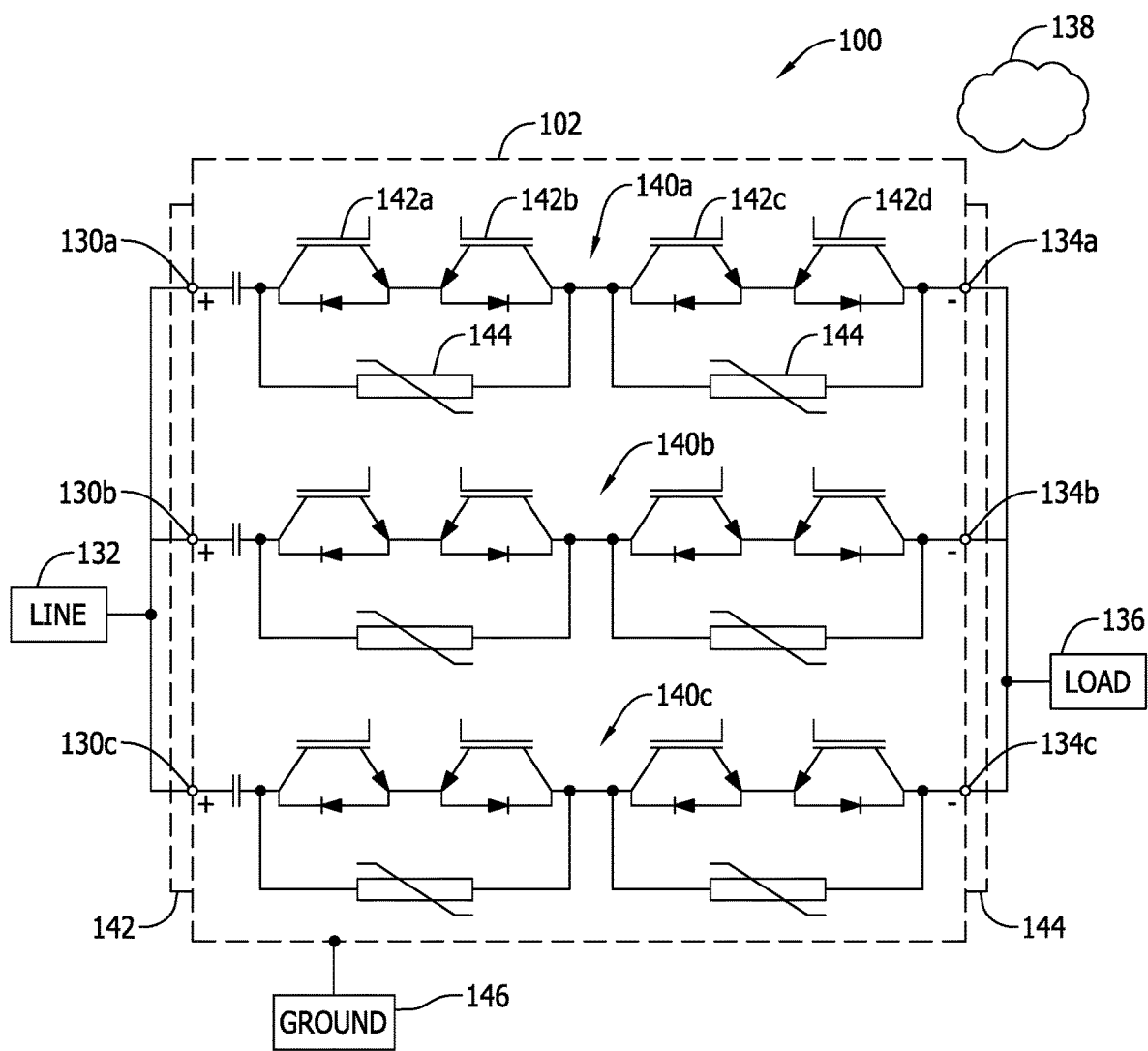
FIG. 2 is a simplified schematic diagram of the circuit protection device shown in FIG. 1 in an exemplary solid-state configuration.

FIG. 2 is a simplified schematic diagram of the circuit protection device 100 in an exemplary solid-state configuration. The device 100 includes input terminals 130a, 130b, and 130c each connected to one phase of a three-phase power supply indicated as line-side circuitry 132 in FIG. 2 via connecting cables, conduits, or wires. The device 100 further includes output terminals 134a, 134b, 136c each connected to load-side circuitry 136 such as motors, fans, lighting devices, and other electrical equipment in an industrial facility wherein ignitable gas, vapors or substances may be airborne as indicated at 138. The output terminals 134a, 134b, 136c may likewise connect to the electrical loads via connecting cables, conduits, or wires. In between each respective pair of input terminals 130a, 130b, and 130c, and output terminals 134a, 134b, and 136c are solid-state switch devices arranged as indicated at 140a, 140b and 140c. The exemplary arrangement includes series connected pairs of insulated-gate bipolar transistors (IGBTs) 142a, 142b, 142c, 142d respectively connected in reverse to one another, with each pair of IGBTs 142a and 142b and 142c, 142d including a varistor element 144 connected in parallel to the IGBTs. The reversed connected IGBTs in each pair precludes reverse current flow through the IGBTs from the load-side circuitry 136 to the line-side circuitry 132 in a known manner.

The IGBTs 142a, 142b, 142c, 142d in each solid state switch arrangement 140a, 140b, 140c are one form of a semiconductor switch that is operable to either permit current flow between the respective input and output terminals 130a and 134a, 130b and 134b, and 130c and 134c from the line-side circuitry 132 to the load-side circuitry 136, or to preclude current from flowing through the device 100 such that the load-side circuitry 136 becomes electrically isolated from the line-side circuitry 132. Briefly, a positive voltage applied from the emitter to gate terminals of the IGBT causes electrons to be drawn toward the gate terminal across a body region thereof. If the gate-emitter voltage is at or above a threshold voltage, enough electrons are drawn toward the gate to form a conductive channel across the body region, allowing current to flow from the collector to the emitter. If the gate-emitter voltage is below the threshold voltage essentially no current can flow across the body region, such that by controlling the gate-emitter voltage current flow between the input and output terminals may be enabled or disabled to connect or disconnect the output terminals from the input terminals of the device 100 via the IGBTs. Equivalent types of semiconductor switch elements other than IGBT elements may likewise be employed, including, but not limited to, Metal Oxide Semiconductor Field Effect Transistor (MOSFET) elements, bipolar transistor elements, silicon controlled rectifier elements (sometimes referred to as thyristors), and the like. The number of semiconductor switch elements may be varied to be greater or less than the number shown in FIG. 2.

The varistor elements 144, connected in parallel to each pair of IGBTs in the arrangement shown, exhibit a relatively high resistance when exposed to a normal operating voltage, and a much lower resistance when exposed to a larger voltage, such as is associated with over-voltage conditions and/or electrical fault conditions. The impedance of the current paths through the varistors 144 are substantially lower than the impedance of the IGBTs when the varistors 144 operate in a low-impedance mode, and is otherwise substantially higher than the impedance of the IGBTs. This means that in normal conditions the high impedance of the varistors causes all of the current to flow through the IGBTs, but as over-voltage conditions arise the varistors switch from the high impedance mode to the low impedance mode and shunt or divert over-voltage-induced current surges away from the IGBTs to the load-side circuitry 136. As over-voltage conditions subside, the varistors 144 may return to a high impedance mode. The varistors 144 beneficially allow, for example, motor inrush currents to flow through the device 100 while otherwise permitting the IGBTs to respond to overcurrent conditions after motor starting is complete. In other applications, however, the varistors 144 may be considered optional and may be omitted.

As a further thermal management feature, the solid-state switch devices (e.g., the IGBTs) in the arrangements 140a, 140b and 140c may be encapsulated with a strategically selected or otherwise formulated material to improve thermal performance of the switch devices 140a, 140b and 140c and/or improve heat dissipation and distribution in use. The encapsulation material of the solid-state switch devices 140a, 140b and 140c may be the same or different from encapsulation materials included in the housing construction, and specifically are targeted to control or limit the operating temperature of the silicon in the solid-state switch devices in normal circuit operation or in overcurrent conditions and electrical fault conditions to prevent overheating of the switch devices themselves or overheating of the housing 102.

While exemplary solid-state switching arrangements are shown and described, others are possible to achieve solid-state switching functionality in an arc-less manner. As discussed above, the solid-state switching devices avoid the type of arcing that mechanical switches produce, and therefore avoid such arcing from being a possible ignition source in an NEC Division 1 or 2 location or in an IEC Zone 1 or 2 location.

In view of the hazardous environment in which the device 100 is to be used, reliable termination of line-side and load-side cables to the input and output terminals is important as loose connections can generate heat and reliability issues, as well as possible ignition concerns in a hazardous location. In an NEC Division 2 location or an IEC Zone 1 or 2 location, the input and output terminals may be accessible from the exterior of the housing 102. Locking terminal connection assemblies and spring-biased terminal assemblies may be utilized to accept and retain ends of the respective cables, while reducing any tendency of the cable connections to loosen over time. In view of some of the device intelligence and fail-safe features described below, however, such locking terminal assemblies and spring-biased terminal connectors may in some cases be considered optional in NEC Division 2 or IEC Zone 1 or 2 locations.

In an NEC Division 1 location, the input and output terminals may further be enclosed in additional housings portions to provide additional safety assurance. Such housing portions may be separately provided from the housing 102 or may be integrally formed as extensions of the housing 102 to isolate the input and output terminals from the explosive environment. In contemplated embodiments, removable cover elements may be provided to access the input and output terminals and complete electrical connections to the input and output terminals inside the enclosures of the housing portions. The line-side and load-side cable connections may further be established, for example, via armored cable and cable glands providing ingress protection, sealing and grounding to safely pass a line-side cable or load-side cable through the enclosures of each housing portion. When used with armored cable, a ground to earth path may be established via the cable gland. Armored cable is not necessary in all embodiments, however, and may not be used. Cable glands may be used with non-armored cable as well.

The housing 102 may be designed and fabricated with thermal management issues in mind to maintain surface temperatures below applicable limits for a given installation in the NEC Division 1 location, and in some embodiments the housing 102 may in whole or in part be explosion-proof in compliance with applicable standards for hazardous locations, albeit with a relatively smaller and more economical housing to provide than conventional, larger and separately provided explosion-proof enclosures that would conventionally contain the entire circuit protector device. The housings 102 and portions thereof defining enclosures for the terminals may likewise include vacuum chambers or may be filled with dielectric fluid, dielectric material or inert gas to reduce or impede electrical arcing at the terminal/cable interfaces or other possible ignition sources. Sand fillers, arc extinguishing fillers, or other known encapsulation techniques may likewise be utilized to address possible arcing concerns within the device 100. Device intelligence and fail-safe features described below provide additional assurance and safety addressing ignition source concerns of the terminal/cable interface, and may render some of the preceding features optional for an NEC Division 1 location.

To address possible static electricity charge buildup, which presents a possible ignition source in an NEC Division 1 location, the housing 102 is shown in FIG. 2 with connection to electrical ground 146. Briefly, static electricity is the result of an electromagnetic imbalance between negative and positive charges in an object. Charging of the housing surface may arise via surface charge involving another object, particularly for insulative portions of the housing, or via charge induction for electrically conductive portions of the housing. Surface charging can also occur during exposure to a high voltage DC power supply, which will cause ions to adhere to the housing surface.

Regardless of how surface charging actually arises, the connection to ground 146 allows any electrical charge buildup on the housing 102 to safely dissipate without creating an ignition source in combustible/hazardous areas. The housing 102 may be grounded to earth ground or chassis ground via a line wire or line conductor connected to the housing 102 on its outer surface. As such, any charging of the exterior of the housing 102 will be quickly dissipated as electrical current to ground and obviate a high voltage discharge event, typically via a spark or shock that could be generated by a person or via a tool utilized by a person in the presence of the explosive atmosphere and cause ignition.

The housing 102 itself could also be fabricated in whole in part from antistatic polymers or antistatic materials that are weakly conductive to electricity from the perspective of charge buildup, but nonetheless considered insulative and non-conductive from the perspective of the electrical power system that the device 100 is protecting. Antistatic materials may improve the housing performance relative to non-antistatic materials by reducing any tendency of the housing to charge in the first instance, and this is another consideration for strategically selecting or otherwise formulating the material(s) to be utilized in the housing fabrication. Antistatic coatings, encapsulants, or shells may be provided on the housing outer surface if desired, although chemical resistance and compatibility must still be ensured as discussed above.

While a single ground connection is shown in FIG. 2, more than one ground connection could be provided in the structure of the device 100 at any desired location. Grounding conductors may be provided interior to the device housing 102 in addition to or in lieu of a grounding conductor connecting to the exterior of the device housing 102 as described. Ground connections for the housing 102 also could be established via a cable connector such as a cable gland when armored cable that already includes a ground path to earth is utilized to make the line-side and load-side connections to the terminals 130a, 130b, and 130c of the device 100. Of course, in some cases, non-armored cable could be used, with or without cable glands, while still eliminating ignition sources in the device 100 and addressing static electricity with an alternative ground connection.

In NEC Division 2 or IEC Zone 1 or 2 locations, the devices would typically be protected by an enclosure, but not an explosion-proof enclosure, and therefore are not as prone to static electricity issues and discharge events. As such, the connection to ground 146 may or not be necessary or desirable in a device 100 for use in a NEC Division 2 location or an IEC Zone 1 or 2 location and could therefore be considered optional. By virtue of the device 100, however, the enclosure containing one or more devices 100 need not be explosion-proof and the conventionally provided explosion-proof enclosure may be omitted.

Figure 3:
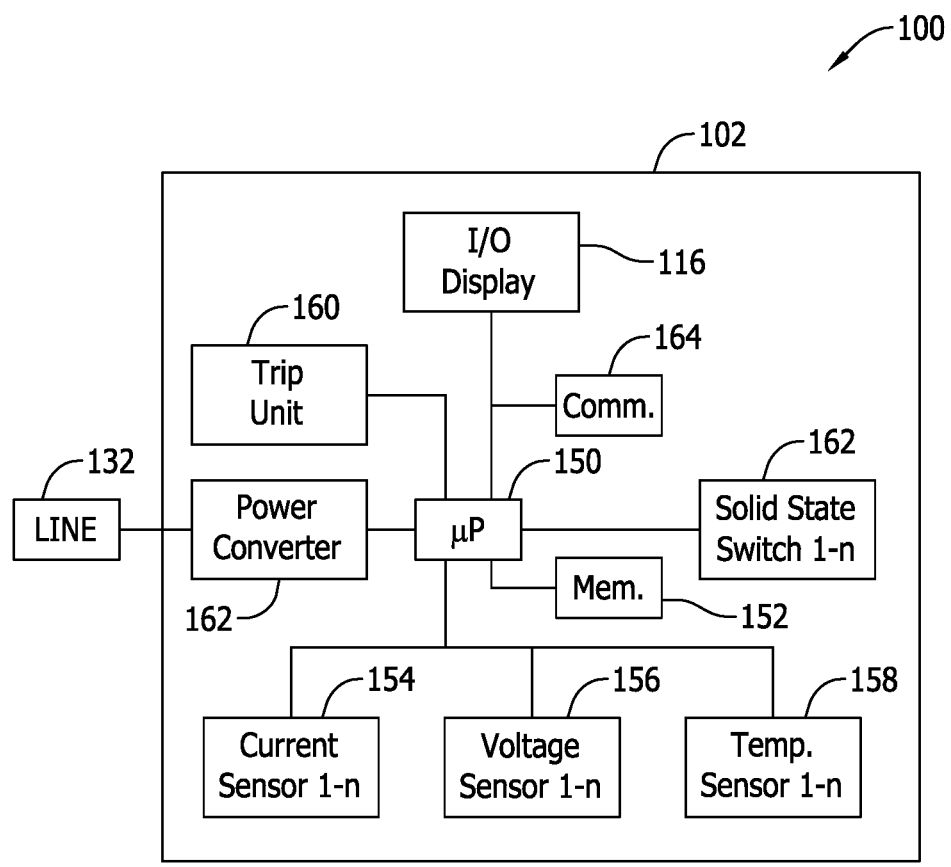
FIG. 3 is a block diagram of the circuit protection device shown in FIGS. 1 and 2.

FIG. 3 is a block diagram of the circuit protection device 100. The device 100 includes a processor-based microcontroller including a processor 150 and a memory storage 152 wherein executable instructions, commands, and control algorithms, as well as other data and information required to satisfactorily operate the device 100 are stored. The memory 152 of the processor-based device may be, for example, a random access memory (RAM), and other forms of memory used in conjunction with RAM memory, including but not limited to flash memory (FLASH), programmable read only memory (PROM), and electronically erasable programmable read only memory (EEPROM).

As used herein, the term "processor-based" microcontroller shall refer not only to controller devices including a processor or microprocessor as shown, but also to other equivalent elements such as microcomputers, programmable logic controllers, reduced instruction set (RISC) circuits, application specific integrated circuits and other programmable circuits, logic circuits, equivalents thereof, and any other circuit or processor capable of executing the functions described below. The processor-based devices listed above are exemplary only, and are thus not intended to limit in any way the definition and/or meaning of the term "processor-based".

The devices 100 also include sensors 154, 156, and 158 provided in a number 1 through n that equal the number of switching poles in the device 100. As such, for the three pole device 100 shown in FIGS. 1 and 2, three sensors of each type may be included that respectively detect current, voltage and temperature at respective locations in the device to assess actual operating circuit conditions in the device. The sensors 154, 156 and/or 158, in turn, provide inputs to the processor 150. Thus, the processor 150, by virtue of the sensors 154, 156 and/or 158, is provided with real-time information regarding current passing through each of the solid-state devices 162 in number 1 through n that equal the number of switching poles in the device 100.

The detected current is monitored and compared to a baseline current condition, such as a time-current curve or time-current profile that is programmed and stored in the memory 152 or the trip unit 160. By comparing the detected current with the baseline current condition, decisions can be made by the processor 150 to control the solid-state switching elements 162, by controlling an output voltage to the gate-emitter voltage in the IGBT's described above, to cease conducting current to protect the load-side from damaging currents. In some embodiments, the trip unit 160 allows the user to select settings for the operation of the trip unit 160 and alter the time-current response of the device 100 within predetermined limits. As one such example, a user may select a current rating of the device 100 at a value from 50 A to 100 A, with the trip unit 160 applying the appropriate time-current curve for the selected current rating.

The detected voltage may likewise be monitored and used to make control decisions whether to operate the solid-state switching elements 162 to protect the load-side circuitry and components from adverse operating conditions. Since voltage and current are related, detected voltage can be compared to detected current to facilitate an assessment of the health of the device 100, identify errors, and facilitate diagnosis and troubleshooting of the electrical power system. As other failsafe measures, voltage and current can be calculated from sensed parameters and compared to the sensor feedback to detect error conditions.

The detected temperature may likewise be monitored and used to make control decisions whether to operate the solid-state switching elements 162 to protect the load-side circuitry and components from adverse operating conditions. Additionally, the detected temperature may ensure that conductors in the device 100 are operating below rated temperatures for the particular hazardous location in which it resides. For example, if the rated temperature is 200° F., the processor 150 can operate the solid-state switches to disconnect and cease current flow when the operating temperature as indicated by the temperature sensors has risen to near 200° F. that could ignite airborne gases, vapors or substances in NEC Division 1 or 2 locations or IEC Zone 1 or 2 locations.

The processor 150 is in communication with the input/output display 116 to provide feedback to a user and to accept inputs made via the display 116.

In the example shown, the processor 150 receives line-side power through power converter circuitry 163. The power converter circuitry 163 includes step down components and analog to digital conversion components when necessary to supply direct current (DC) power to the processor 150 at reduced voltage in a known manner. Conversion of the line power to appropriate levels to power the electronics avoids any need for an independent power supply, such as batteries and the like or a separately provided power line for the electronic circuitry and controls that would otherwise be necessary, although in some embodiments such an independent power supply may indeed be included if needed or as desired. The controls described may be implemented on a circuit board or circuit boards in various arrangements of electronic packages, with algorithmic control features programmed and stored in the device memory.

A communication element 164 is also included that may communicate data to a remote location, as well as other device 100 as described further below to assess operation of the larger electrical power system in local and remote locations relative to any particular device 100. Wireless and non-wireless communication of data of interest, including but not limited to current data, voltage data, temperature data, on-off status data of the solid-state switching elements, selected setting data, trip time data, etc. is possible, and such data may be stored and archived locally and remotely for of the electrical power system over time. As described below, wiring size data and/or amperage limit data may be communicated to improve safety of the device in NEC Division 1 or 2 locations or in IEC 1 locations. Remote actuation of the device 100 is also possible via the communication element 164 for electrical power system maintenance or coordinated circuit protection via communication with other circuit protection devices and/or remote devices that facilitate manual or automatic monitoring and management of the electrical power system.

While an exemplary architecture has been described for the device 100, it is understood that certain elements shown in FIG. 3 may be considered optional to provide more basic functionality. Moreover, additional elements could be added to realize still further sophistication and intelligence in the operation of the device 100, as well as to provide additional functionality beyond circuit protection and disconnection functionality.

Figure 4:
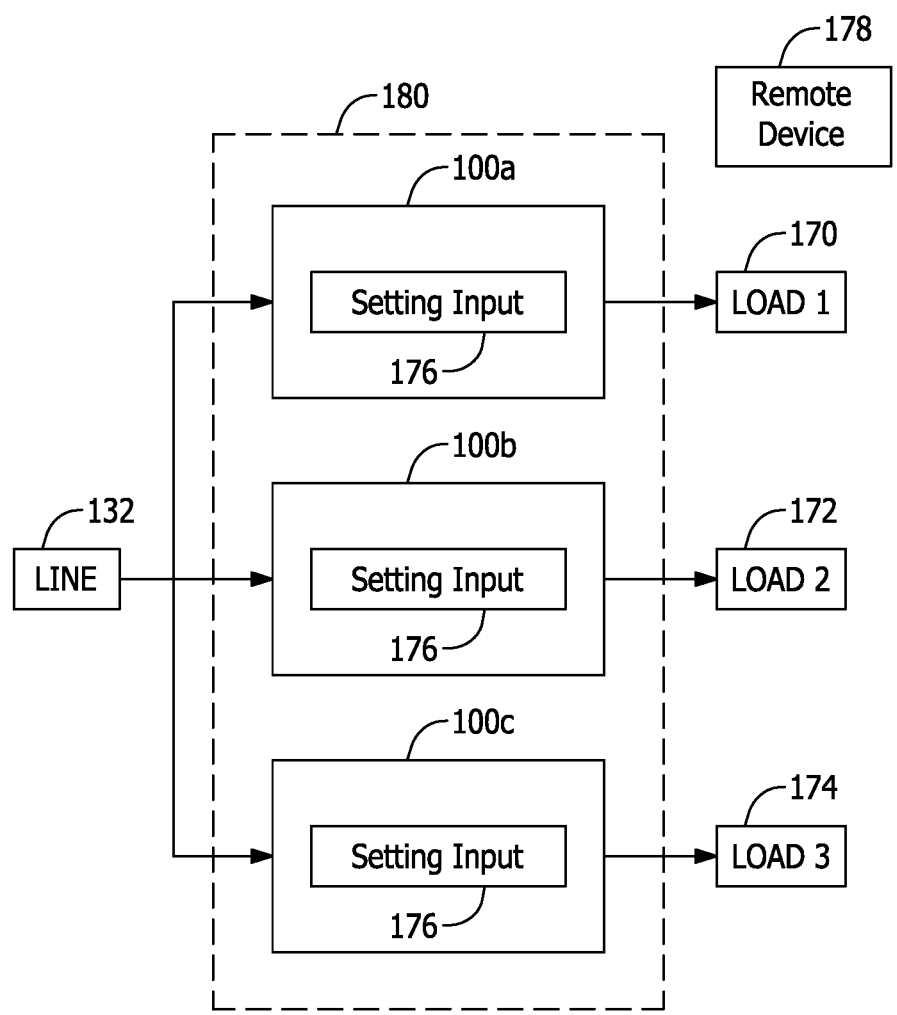
FIG. 4 is a block diagram of a panelboard installation of circuit protection devices shown in FIGS. 1 through 3 and illustrating selectable setting inputs to respectively power different electrical loads.

FIG. 4 is a block diagram of circuit protection devices 100 illustrating selectable setting input features of the devices to respectively power different electrical loads having different current requirements. Three circuit protection devices 100A, 100B, and 100C are shown connected between the line-side power supply 132 and a respective first electrical load 170, second electrical load 172, and third electrical load 174. Each circuit protection device 100A, 100B, 100C includes a user-selectable setting input 176 that may define, for example, a maximum current limit, sometimes referred to as an ampacity limit, that the loads 170, 172, and 174 can safely handle.

In contemplated embodiments, each device 100A, 100B, 100C may operate with an ampacity limit in a range of 50 A to 100 A to service different loads, with a user selecting an availability ampacity limit within the range provided. As such, and for example, each device 100A, 100B, and/or 100C may operate with a 60 A ampacity limit, an 80 A ampacity limit, and a 100 A ampacity limit that powers corresponding electrical loads with a 60 A ampacity limit, an 80 A ampacity limit, and a 100 A ampacity limit. In various, non-limiting examples, the ampacity limit setting for each device 100A, 100B, and/or 100C is input by a user via the display 116 (FIG. 1), another input element provided on the device, or via a remote, processor-based device 178 in communication with the devices 100A, 100B, and/or 100C. Also, an available ampacity limit, or a range of ampacity limits for each device 100A, 100B, and/or 100C may be changed or altered via removal and replacement of the trip unit 160 (FIG. 3).

The devices 100A, 100B, and 100C therefore may be used with different power systems operating at different voltages and currents to protect electrical loads having different circuit protection requirements. Each ampacity setting corresponds to a respectively different time-current curve or time-current profile to control the operation of the switching devices accordingly, allowing the devices to be universally used in different applications within the range of ampacity settings provided. Considerable versatility is therefore provided to use the same devices 100A, 100B, and 100C to meet a variety of different circuit protection needs for a variety of different power systems and electrical loads. As AC power systems and DC power systems present different issues from the circuit protection perspective and from the hazardous location perspective also present different thermal issues, different versions of devices 100A, 100B, and 100C are contemplated for AC and DC systems.

In the example of FIG. 4, the devices 100A, 100B, and 100C are installed on a panelboard and as such each device is connected through the bus structure of the panelboard to the same line-side circuit 132 which is operable at a given voltage and current in normal operation. The electrical loads 170, 172, and 174 are protected by the devices 100A, 100B, and 100C to prevent excessive current from flowing to the electrical loads in abnormal conditions of the line-side power supply circuit 132. For electrical loads of the same type having similar circuit protection requirements, the same ampacity setting (e.g., 100A) typically would be used on each of the devices 100A, 100B, and 100C.

In other embodiments that may or may not involve a panelboard, one or more of the devices 100A, 100B, and/or 100C could alternatively be connected to different line-side circuits operable at different voltages and currents in normal operation and thus the devices 100A, 100B, and 100C may operate at respectively different ampacity settings. The adjustable settings of the devices 100A, 100B, and 100C nonetheless allow them to accommodate some variation in the line-side and load-side circuitry while still effectively providing desired circuit protection.

Actually achieving the desired circuit protection is dependent, however, on whether the wiring utilized to establish the line-side and/or load-side connections is compatible with the user-selected ampacity setting of the devices 100A, 100B, and 100C in any given installation. For instance, if the wiring or cabling utilized to make the load-side connections has an ampacity limit of 50 A, a device setting of 100 A will pass through currents that well exceed the ampacity limit of the cabling if they should arise. This means that the cabling could overheat to the point that it could raise an ignition concern and/or fail and generate arcing at the terminals of the device or elsewhere. Safeguards are therefore provided as described next to detect inadvertent user input of an incompatible setting for the device that exceeds the corresponding limit of the wiring connecting to the devices 100A, 100B, 100C.

Figure 5:
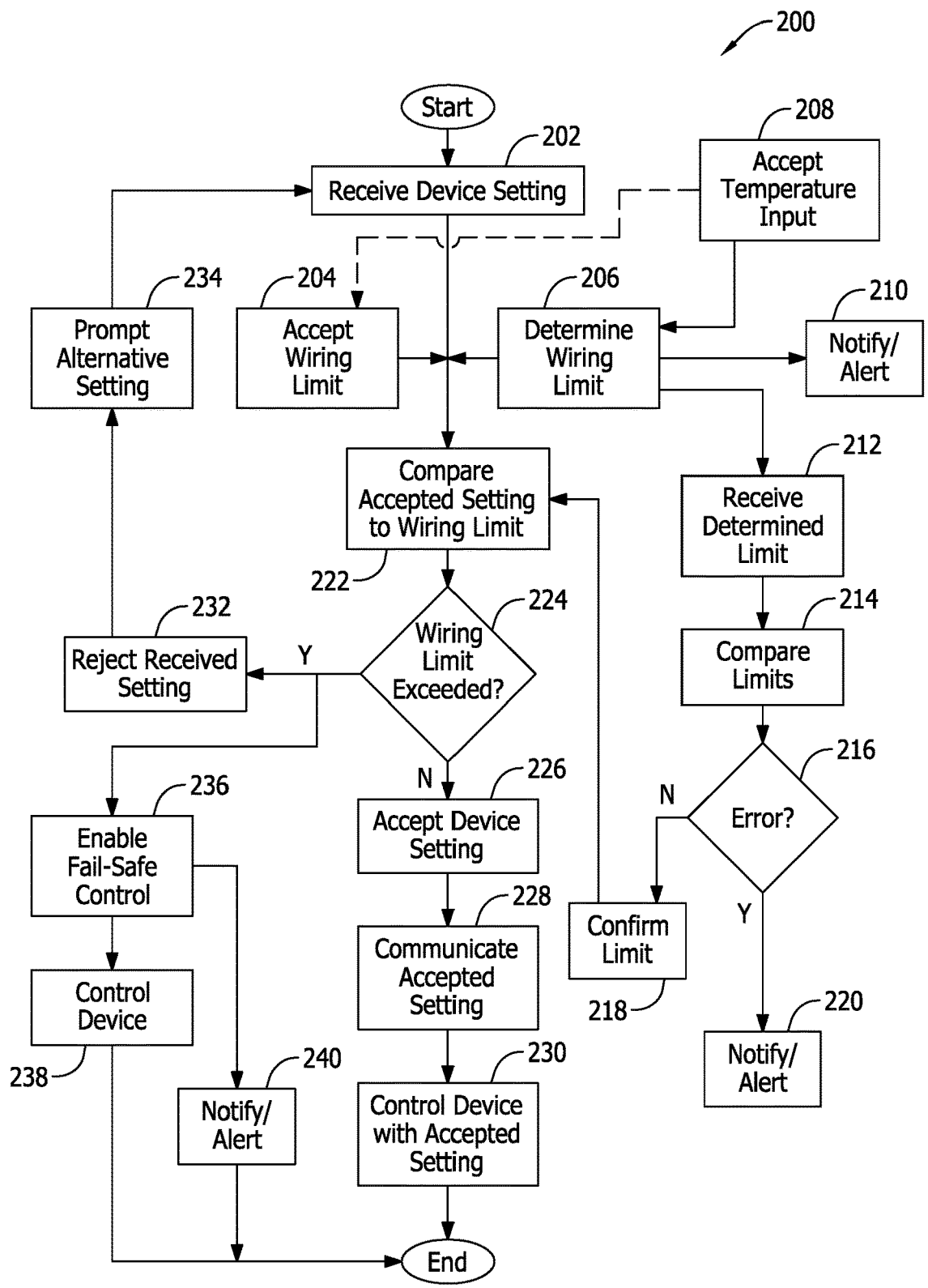
FIG. 5 is a flowchart of an exemplary process algorithm ensuring setting compatibility and fail-safe measures for the circuit protection devices shown in FIG. 4.

FIG. 5 is an exemplary flowchart of an exemplary process algorithm 200 for use in ensuring device limit setting and wiring limit compatibility, and intelligently implementing fail-safe measures for the circuit protection devices 100A, 100B, and 100C (FIG. 4) in view of any conflicting device setting with the wiring in place. The algorithm 200 may be implemented by the processor 150 of the device 100 (FIG. 3) and/or via a remote processor-based device, such as the remote processor-based device 178 (FIG. 4), that is in communication with the processor 150 of each device. The algorithm 200 may be performed device-by-device in the particular installation locations of each device 100A, 100B, and 100C.

At step 202, the device setting (e.g., the ampacity setting) is received at one of the devices 100A, 100B, and 100C. The device setting may be input by the user in any manner described above, or otherwise known in the art, and after the input is made, the device setting is accordingly received by the processor 150 or remote device 178 of the respective device for which it was input for evaluation with wiring compatibility as described below.

At step 204, a wiring ampacity limit is also accepted for the device location and the wiring used to connect the device to the power system. The wiring ampacity limit typically relates to wire gauge of the line-side or load-side wires. The wire gauge reflects a measurement of wire diameter and its cross sectional area to conduct electrical current, which in turn relates to the amount of electric current a wire can safely carry over a specified duration, as well as its electrical resistance and weight. Wire having a larger diameter can therefore carry a greater amount of current than a wire having a smaller diameter. Wire length and other factors unique to a particular installation may also impact the wiring limit and should be considered.

For the present discussion the wiring ampacity limit represents a maximum or peak current load that the wiring can withstand for a predetermined amount of time before being heated to the point of structure failure. The wiring ampacity limit for any particular wire may be theoretically or empirically determined, and in most cases may be inferred from the wire gauge. The wiring ampacity limit may be specified in the initial design and construction of a new electrical power system and input to the devices 100 as the electrical power system is initially wired and completed by the devices. Likewise, the wiring ampacity limit may be made known from construction blueprints or other records and input to the device 100 accordingly.

In certain contemplated embodiments, wiring ampacity limits could be initial user input parameters required by the devices 100 prior to allowing a user to select one of the desired amperage settings. For instance, the user could be prompted via a local or remote user interface to identify a wire material (e.g., copper or aluminum) and ampacity limit as connections are made the devices 100. The devices 100 could also have a built-in NEC wire ampacity chart (i.e., an ampacity chart stored in the memory of the device) for reference by the user to make the desired device inputs, or for reference by the device afterward to ensure that device ampacity settings cannot be selected that are higher than the applicable wiring limits.

In cases where the wiring is exposed the wiring ampacity limit may be known via inspection thereof and input to the device 100 by the user without reference to a material, chart, or other information provided via the device 100. In still other cases, the wiring ampacity limit may not be known or easily determined, and as such step 204 may be optional and need not be performed.

At step 206, the wiring ampacity limit may also be determined via sensing, inference and calculation techniques described below. The determination at step 206 may include determining wiring ampacity limits at each of the line-side and load-side terminals. In evaluating the line and load-side connections, certain issues can be detected that are significant to operation of the device 100 in a hazardous location. Specifically, any differences in the wiring limits on the line-side and load-side wiring, whether intentional or inadvertent in the installation of the electrical power system, should be taken into account, and the lower limit should be used to avoid ignition risks in a hazardous location.

For example, if the load-side wiring is found to have a larger ampacity limit than the line-side wiring, the settings of the device 100 should be evaluated according to the smaller limit of the line-side wiring, not the larger limit of the load-side wiring. If, for instance, the line-side wiring has a limit of 50 A and the load-side wiring has a limit of 100 A, a device setting of 100 A would allow current flow to pass through at levels above the 50 A limit that is not problematic to the load-side wiring, but poses overheating risk, and associated ignition risk, to the line-side wiring that should be avoided in a hazardous environment. In this scenario the device 100 should be operated at the 50 A setting only.

Likewise, if the load-side wiring has a limit of 50 A and the line-side wiring has a limit of 100 A, a device setting of 100 A would allow current flow to pass through at levels above the 50 A limit that is not problematic to the line-side wiring, but poses ignition risk to the load-side wiring that should be avoided in a hazardous environment. While the line-side and load-side wiring may be expected to have the same ampacity limit in many applications, this can be confirmed at step 206 and avoid false assumptions in cases where the line-side and load-side wiring have different wiring limits.

Also, since the wiring ampacity limit may be influenced by temperature, at step 208 a temperature input may be received from one or more of the temperature sensors in the device 100, and/or from another temperature sensor external to the device 100. As such, when the ambient temperatures are elevated in the location of the respective devices 100, adjustments can be made to the determined or accepted wiring ampacity limits from steps 204 and 206. Specifically, as the ambient temperature rises, the wiring limits should be adjusted downward as the heat effect of the ambient environment and the heating effect from electrical current are cumulative in the wiring. Because of this, for any given wire, the wiring ampacity limit may actually be reached at varying current levels depending on whether the ambient environment is hot or cold. For example, wiring having an ampacity limit of 100 A before a temperature adjustment could have an ampacity limit of 80 A after a temperature adjustment. This means that a device 100 set at 100 A while operating in elevated ambient temperature conditions could still pass through currents of 80 A to 100 A to the load-side wiring that, while below the setting limit, could nonetheless cause overheating of the wire and pose an ignition concern in a hazardous location.

When the temperature input at step 208 exceeds a predetermined threshold for the determined wiring limit at step 206, the processor can generate a notice or alert at step 210 to responsible personnel or other processor-based devices in order for corrective actions or intervention to be appropriately undertaken. The notification or alert may include pertinent data and explanation of a potentially dangerous operating condition that may result in upstream circuit breakers and switches to be actuated (locally or remotely as well as manually or automatically) to avoid further heating of the wiring due to cumulative heating effects. The generated notice or alert at step 210 need not indicate that the wiring ampacity limit poses any particular issue or that there is any overcurrent condition present, but may instead be deemed as a flagged indicator of an external source generating excess heat that presents an increased risk of overheating and ignition of the wiring, and therefore may provide a basis to proactively shut down the electrical power system. Escalating notices or alerts if possible if ambient temperatures continue to rise or do not subside in a predetermined timeframe. Optionally, a control feedback loop may be implemented to reduce or limit current flowing through the device 100 until temperature is reduced to an acceptable range, or alternatively to disconnect and preclude all current flow through the device 100 if a certain temperature threshold is met.

At step 212, a determined wiring limit is received from another nearby device 100 via, for example, wired or wireless communication or from the remote device 178 by wired or wireless communication. At step 214, the determined wiring limit from step 206 is compared to the determined wiring limit from the nearby device at step 212. The comparison provides a basis to determine whether an error exists at step 216. If the compared limits match or are reasonably consistent, no error is presented and at step 218 the determined wiring limit from step 214 may be confirmed. If the compared limits diverge or conflict at step 216, an error condition is presented and at step 220 a notification or alert is presented so that appropriate steps can be taken to investigate possible errors. Steps 212 through 218 may be the most practical in a panelboard installation wherein similar loads are known to be connected to similar wiring, which the devices can confirm by comparison to one another. In cases where steps 212 through 218 may not be conclusive, whereby nearby devices 100 do not exist, or where similar loads and wiring do not exist, steps 212 through 218 may be considered optional and may be omitted.

At step 222 the received setting from the user at step 202 is compared to the accepted setting at step 204 (if applicable) and the determined or confirmed wiring limits of steps 206 or 218, including any needed adjustments for temperature at step 208. Multiple and different data points provide system redundancy and health-check capability to identify malfunctioning devices or other problems that would otherwise not be apparent to a user.

At step 224, a determination is made whether the received ampacity setting from the user at step 206 exceeds the wiring limit as informed by the above-described inputs of steps 204, 206 and 218. If the wiring ampacity limit is not exceeded by the received user setting, the setting is accepted as a valid and safe selection for use by the device 100. At step 228 the accepted setting is communicated to other devices 100 and/or to the remote device 178.

The accepted setting as communicated to other devices may be another basis to compare and determine error conditions or inconsistencies vis-a-vis the settings of other devices. For instance, in a panelboard installation including 24 devices, if 23 of the devices 100 are set to 60 A, a received setting of 50A for the 24th device 100 may be flagged as possibly incorrect, even if it does not exceed the wiring limit. A received setting that is too low can result in nuisance operation of the device 100 by being over-sensitive to current conditions that actually are not problematic from a circuit protection perspective. Likewise in a panelboard installation including 24 devices, if 23 of the devices 100 are set to 60 A, a received setting for the last device of 70A may be flagged as possibly incorrect, even if the 70 A limit does not exceed the wiring limit. A received setting that is too high can result in the device 100 not being sensitive enough to current conditions to meet the needs of a particular load.

At step 230, the received setting from the user at step 206 that is accepted at step 226, is used to select the corresponding time-current curve or time-current profile, and operate the switching elements accordingly to implement the desired circuit protection per the setting selected. By virtue of the assessment above, the received setting from the user may be safely applied with assurance that the wiring will not overheat and present a possible ignition source due to a user setting that exceeds the capability of the wiring to handle.

If at step 224 the received setting from the user at step 206 does exceed the wiring ampacity limit, the received setting is rejected at step 232. The user may be prompted to select another setting at step 234 and the algorithm returns to step 202 to evaluate the next received setting. As such, the device 100 cannot be used unless a setting is received that is compatible with the wiring in place. Device settings that are incompatible with the wiring will not be accepted, and associated risks of ignition are avoided for use in hazardous locations.

As an alternative to steps 232 and 234, if the received setting from the user at step 206 exceeds the wiring ampacity limit at step 224, the device 100 can enter a fail-safe mode at step 236. In the fail-safe mode, the device 100 is controlled at step 238 at the nearest setting that does not exceed the wiring limit. That is, a 100 A setting may be automatically changed to an 80 A setting by the processor 150 of the device 100 or the remote device 178 due to wiring limit issues, and at step 328 the corresponding time-current curve or time-current profile is selected in order to operate the switching elements accordingly to implement a fail-safe mode of circuit protection that does not exceed the wiring limit. At step 240 a notification or alert is made that the received setting (e.g., 100 A) was reset to another setting (e.g., 80 A) in view of the applicable wiring limits to avoid any ignitions that could otherwise be presented. The device 100 is essentially foolproof in these aspects, without causing rejection of user input and related prompts to make another setting selection that could confuse or frustrate certain users attempting to set the device.

Such fail-safe mode of operation could also be proactively undertaken in response to ambient temperature inputs and other considerations by the processor 150 or the remote device 178. For example, a 100 A setting that was previously validated in the algorithm may be reset to an 80 A setting if the ambient temperature rises to a first predetermined threshold, and again reset to a 60 A setting if the ambient temperature rises to a second predetermined threshold to manage ignition risks as conditions change in the ambient environment. As the settings are reset, notifications and alerts may be generated for user feedback and for coordinated system control with other circuit protectors and devices controlling the electrical power system.

Figure 6:
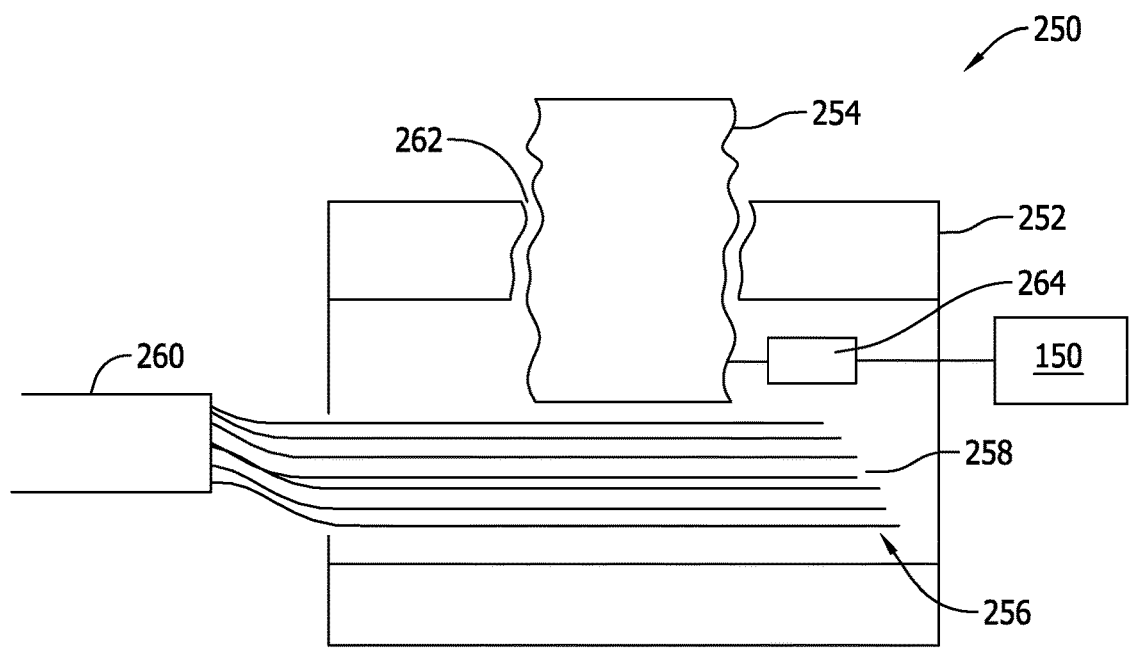
FIG. 6 illustrates a detection technique for determining a wiring limit for the algorithm shown in FIG. 5.

FIG. 6 illustrates a detection technique for determining a wiring limit for the algorithm 200 (FIG. 5). As shown in FIG. 6, a terminal assembly 250 includes a lug terminal 252 and a conductor fastener 254 such as a screw. The lug terminal 252 defines a conductor passage 256 for a single or multi-strand conductor 258 contained within a cable jacket 260. A threaded aperture 262 is formed on the upper side of the lug terminal 252. The fastener 254, in the exemplary embodiment, is a screw configured to advance toward and away from the conductor passage 256. After the conductor 258 is extended into the conductor passage 256, the fastener 254 is advanced to physically contact and engage the conductor 258 with sufficient clamping force to ensure a desired contact force and secure electrical connection between the conductor 258 and the terminal lug 252.

One way of detecting the ampacity limit of the conductor 258 is to detect the position of the conductor fastener 254 vis-a-vis the terminal lug 252 and the conductor 258. The position of the fastener 254 when engaged to a conductor is a function of the size (e.g., the diameter) of the electrical conductor 258. Each rotation of the fastener thread advances the fastener 254 a known distance towards the cable conductor 258. The overall dimension of the conductor passage 256, in which the threaded shank of the fastener 254 can move (the vertical dimension in the plane of FIG. 6), is fixed in the terminal lug 252, so if the distance that the fastener shank extends into the conductor passage 256 is known, the dimension of the cable conductor 258 can be calculated by subtracting the distance that the fastener shank extends from the overall dimension. The dimension of the cable conductor 258 can then be compared to corresponding dimensions of known wire gauges.

In one embodiment, a position sensor 264 is provided to detect the engaged position of the conductor fastener 254 within the lug terminal 252 and to generate a signal corresponding to the detected position of the conductor fastener 254 to a processor 150 of the device 100 or to another device such as the remote device 178 (FIG. 4). The engaged position of the fastener can be mechanically or electrically detected, for example, by detecting the number of turns of the fastener 254 from a known start position to its engaged position. The engaged position can also be detected mechanically or electrically after it is engaged to determine the portion of the conductor passage 256 occupied by the fastener. Likewise, the cable conductor mentioned may in some cases be directly detected via comparative detection and analysis of the conductor passage 256 before and after the cable conductor 256 is inserted.

The processor 150 can calculate or infer the conductor diameter from the fastener turns detected, from the engaged position of the fastener, or from the detected dimension of the cable conductor 258, and correlate each of them to the closest attribute of a known wire gauge. A lookup table or other database may then be consulted to retrieve the applicable wiring ampacity limit for the closest matching wire gauge (wire type, temperature rating, material, etc.). In some contemplated examples, a conductive material (e.g., copper) may be assumed for the connections being made in the cable/wiring. Additional lookup tables and inputs or determinations may be implemented, however, in the event that wires or cables having different conductor materials (e.g., aluminum) may be present. In some cases wherein the wiring run (e.g., length) is known or can be calculated via voltage drop from sensed connections at both ends, wiring upsize recommendations may be made by the system to improve wiring performance.

In certain embodiments, detecting the fastener position may also detect loose terminal connections, either initially or due to a change in position of the fastener 254 over time in the event that it loosens due to vibration or thermal cycling in the hazardous location. An initially-loose connection may be detected, for example, by empirically or theoretically determining a baseline position of the fastener 254 that achieves optimal clamping force and contact force for each wire gauge, and comparing the detected position to the baseline position. Feedback can be provided to the user on the device display 116 (FIG. 1) or by other means to ensure that adequate connections are established. Loosening of the fastener 254 can likewise be determined by periodically checking and comparing the detected fastener position to the baseline position. Loose connections should be avoided as they increase resistance and generate heat at the terminal, posing possible ignition concerns. In some cases, the device 100 can detect loose connections via a detected increase of resistance at the respective terminals of the device. As desirable or as needed, the switching elements in the device 100 can be operated to limit the current until the loose terminal connections can be corrected.

In certain embodiments, the terminals including the fasteners may include a positive indication feature for reference by the user or by the device 100 that facilitates a consistent assessment of the position of the wire relative to the fastener (or vice versa).

In some cases, the terminal lugs may include different locations for wires to be inserted that should be taken into account when trying to infer the wire gauge from the fastener position as wires inserted in different locations may result in the fastener ending in different positions when tightened. To accommodate for such varying possibilities, the user may in some cases input the number of turns of the fastener (starting from a predetermined start position), or input which particular location in a lug that a wire is being inserted to facilitate the detection of the wire gauge and corresponding wiring limits.

In further and/or alternative embodiments further inputs regarding different wire types (e.g., solid wire vs. stranded wire) may be implemented with appropriate compensation in the algorithm to account for different wire types to consistently determine wiring limits.

In some embodiments, optical sensors and the like may be included in the device 100 allowing the device controls to automatically detect and distinguish wiring and terminal variations.

In embodiments wherein a prescribed allowable wire type precludes other possibilities, a simplified algorithm is possible without detailed user inputs of wiring type and attributes as described above.

In still further embodiments, devices 100 may communicate with one another and compare, for example, resistance in the wired connections between respective devices with inputs of the wire type, length, etc. If the determined resistance, which relates to operating temperature, is within an acceptable range safe operation of the electrical system can be confirmed. If determined resistance exceeds a predetermined threshold, however, appropriate measures and actions can be taken in response including those discussed above.

While exemplary techniques for determining wiring ampacity limits are described, others are possible in further and/or alternative embodiments of devices and systems.

Figure 7:
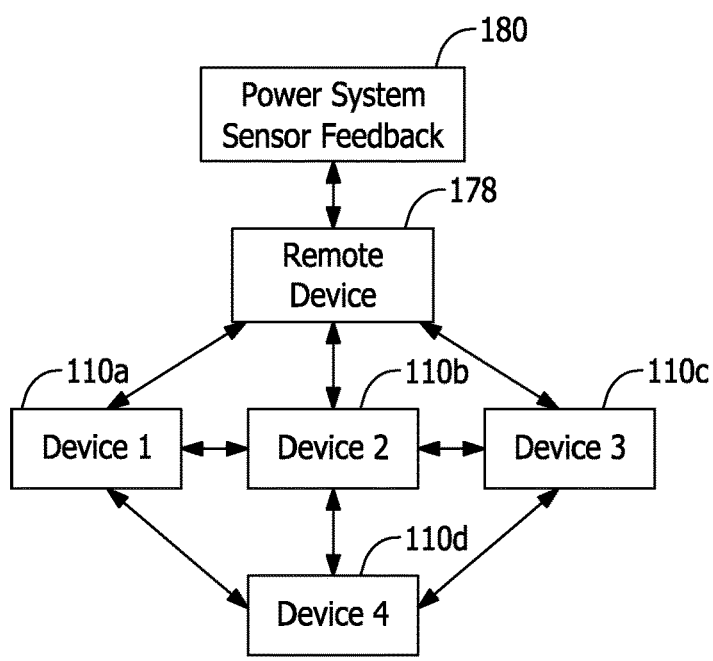
FIG. 7 illustrates an electrical power sensor feedback system including circuit protection devices shown in FIGS. 1 through 3.

FIG. 7 illustrates an electrical power sensor feedback system including circuit protectors 100A, 100B, 100C and 100D, the remote device 178 (also shown in FIG. 4) and power system feedback sensors 180 that are external to the devices. The devices 100A, 100B, 100C and 100D are each in communication with one another, with the remote device 178, and directly or indirectly with the power system feedback sensors 180 and provide an expanded sensor system or network that may further allow detection and control of conditions that may present ignition risks if not addressed.

Each device 100A, 100B, 100C and 100D is an intelligent device including sophisticated sensing and evaluation capabilities concerning the specific points of installation in the power system as described above. In combination with the power system feedback sensors 180, intelligence of the devices 100A, 100B, 100C and 100D may be further enhanced concerning the larger electrical power system to which they are connected, imparting still further functionality with substantial benefit to system operators and enhancing operational safety in hazardous environments even further.

For example, the devices 100A, 100B, 100C and 100D provide feedback loops to one another and to the power system feedback sensors 180 that can be analyzed by a remote device, or the individual devices 100A, 100B, 100C and 100D themselves, to more effectively regulate the operating power system while actively managing the surface temperatures of devices 100A, 100B, 100C and 100D and associated wiring, as well as devices other than the devices 100A, 100B, 100C and 100D in the power system.

For example, the power system feedback sensors 180 may include temperature sensors for the ambient environment and for operating temperatures of components other than the devices 100A, 100B, 100C and 100D at locations other than where the devices 100A, 100B, 100C and 100D reside. Detected temperatures from the power system feedback sensors 180 may be compared to the detected temperatures by the devices 100A, 100B, 100C and 100D and also compared to predetermined criteria. Health checks and error conditions can be detected and notifications and alerts can be generated. Devices upstream and downstream from one another in the power system may communicate and compare detected temperatures, and proactive steps may be taken to operate switches and proactive circuit protectors, including but not limited to the devices 100A, 100B, 100C and 100D in response to detected conditions. For example, high ambient temperatures detected downstream may cause one or more of the devices 100A, 100B, 100C and 100D to limit current to the downstream devices, even though excessive ambient temperatures have not been detected by the devices

100A, 100B, 100C and 100D. Likewise, the remote device 178 may operate devices other than the devices 100A, 100B, 100C and 100D to mitigate problems that may not have been detected at the locations of those devices.

In another example, tripping of circuit protectors upstream or downstream may indicate electrical problems (excessive overloads or short circuit conditions) that have not been detected at the locations of the devices 100A, 100B, 100C and 100D but can be mitigated via operation of the devices 100A, 100B, 100C and 100D to limit current to specific locations. The collective feedback data provided and made available may be utilized to diagnose issues of the power system and the sources of those issues by specific location. Comparison of temperature data for devices that are in close proximity to one another can reveal loose terminal connections that operate at comparatively higher temperatures that are not explained by ambient temperature differences or actual operating electrical current conditions.

The devices 100A, 100B, 100C and 100D and/or other devices in the power system feedback sensors 180 may implement infrared sensing to determine heat signatures at the terminals of each device, providing confirmation of proper operation of the power system or clues to power system issues that need to be diagnosed. Such issues may include loose connections that cause increased resistance and increased operating temperatures. Predetermined baselines for comparison may be stored and utilized to detect loose terminal connections, oversized or undersized wiring, overload conditions, etc.

The devices 100A, 100B, 100C and 100D and/or other devices in the power system feedback sensors 180 may also include arc-fault circuit interrupter (AFCI) components or ground fault circuit interrupter (GFCI) components. Arc signatures may be detected and/or operation of such components may facilitate diagnosis of power system operation, problem points, and or explanation for tripping events of circuit protectors at specific locations in the system. To the extent that arcing may be caused by a loose terminal connection, such components can detect and identify them while providing enhanced circuit protection and avoidance or suppression of arcing to levels below those that are sufficient to present ignition concerns.

In combination, detection and sensing of various parameters by devices 100A, 100B, 100C and 100D and/or other devices in the power system feedback sensors 180 provide system redundancy to efficiently diagnose issues or resolve ambiguities that may otherwise exist.

For example, a terminal that is running hotter than expected as compared to other similarly situated terminals may indicate a loose connection as noted above. The terminal fastener position detection may confirm positively or negatively whether the connection is actually loose and thus eliminate false positives in identifying loose terminals. If a terminal is not loose but is running hot, the voltage and current sensors may confirm positively or negatively whether an overcurrent explains the terminal temperature. If an overcurrent does not exist then the terminal the temperature could be elevated because of an incompatible device setting, which can be evaluated as explained above. If the device setting is not incompatible then there may be an error in the wiring ampacity limit, which can be confirmed by voltage and current readings of other devices. Such analysis can proceed iteratively until a conclusion is made, and if the system cannot reach a conclusion it can send a notification or alert including the data that was checked to rule in or rule out possible diagnoses.

Analysis and diagnoses can be reported and archived to provide invaluable insight into the operation of the devices 100A, 100B, 100C and 100D and the remote device 178, and/or insight into the operation of the power system over time for troubleshooting and diagnostic purposes. The devices 100A, 100B, 100C and 100D and/or the remote device 178 in communication with the sensors may additionally be self-learning over time as events are diagnosed, in order that the system becomes more efficient and reliable to correctly deduce operating conditions without having to exhaustively consider all possibilities.

The devices 100A, 100B, 100C could also, individually and in combination, sense things like phase to phase or phase to ground shorts. For instance, if a maintenance person were to leave a screwdriver following a service event in a manner that shorts a phase to ground or to another phase the sensors and intelligence in the device 100 may detect such a condition, and prevent energization of the device and any resulting arcing event.

In another aspect, intelligent sensing in the devices 100A, 100B, 100C may, individually and in combination, identify a loss of phase or phase imbalance in the power system, as well as human error in the connection of the devices. For instance, if a three pole device is installed to only two poles of a power system, the devices 100A, 100B, or 100C can detect this condition and prevent the respective device(s) from being energized until all of the connections are properly completed. As another example, intelligent sensing may be used to differentiate a loss of phase condition (e.g., when only two of the three phases of a properly connected three phase power supply are present) from other conditions (e.g., the aforementioned error to connect the third phase.

In another aspect, the devices 100A, 100B, 100C may, individually and in combination, sense a status or condition related to the device housing to ensure that certain requirements are met in order to energize the device or to change its state remotely. For instance, the devices 100A, 100B, 100C may include peripheral sensors that feedback to the device to ensure bystander personnel are positioned safely with respect to one or more of the devices 100A, 100B, 100C before the devices the devices 100A, 100B or 100C are operated locally or remotely.

In another aspect, intelligent sensing within the devices 100A, 100B, 100C can extend to the structural condition of each device 100A, 100B or 100C in use. For example, the devices 100A, 100B, 100C may include strain gauges, accelerometers, pressure sensors, chemical sensors, etc. that can all be used to monitor the environment and/or structural integrity of the devices 100A, 100B, 100C that provide the hazardous protection, thereby ensuring that the devices 100A, 100B, 100C remain compliant with the governing standards well after the initial installation.

Figure 8:
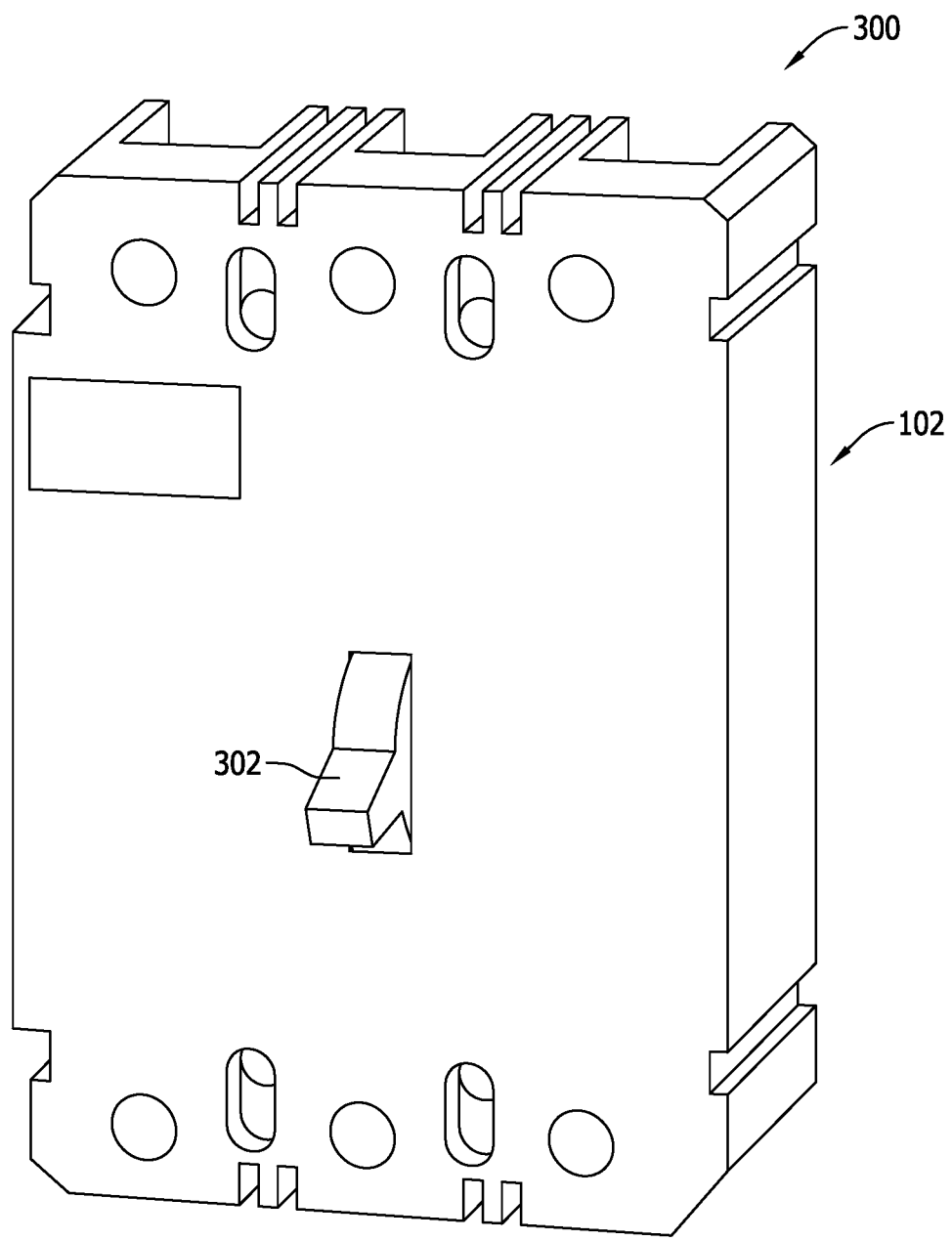
FIG. 8 is a perspective view of a compliant, hazardous location arc-less circuit protection device according to a second exemplary embodiment of the invention.

FIG. 8 is a perspective view of a compliant, explosive location circuit protection device 300 according to a third exemplary embodiment of the invention. The circuit protection device 300 includes the housing 102 described having the chemical resistance, impact resistance and thermal management features described above in relation to the device 100, but omits the digital display 116 of the device 100 (FIG. 1). As shown in FIG. 8, a toggle switch 302 is accessible to a user on the upper face of the housing 102 for manual activation of the device 300 between "on" and "off" states to connect and disconnect the load-side of the device 300 from the line-side. Manual actuators other than toggle switches may be employed in other embodiments. In some cases, the display 116 could be provided in addition to or in lieu of the toggle switch 302 or another manual actuator.

Like the device 100, the device 300 may interconnect line-side or power supply circuitry and electrical loads operating via alternating current (AC) or direct current (DC). The device 300 as shown is configured as a circuit breaker and therefore provides automatic circuit protection in response to predetermined overcurrent conditions, which may be selected by the user within a certain range and input to the device a local or remote user interface, or otherwise pre-programmed into the device. The device 300 may operate according to specified time-current curves or time-current profiles suitable to provide adequate protection for connected loads.

Figure 9:
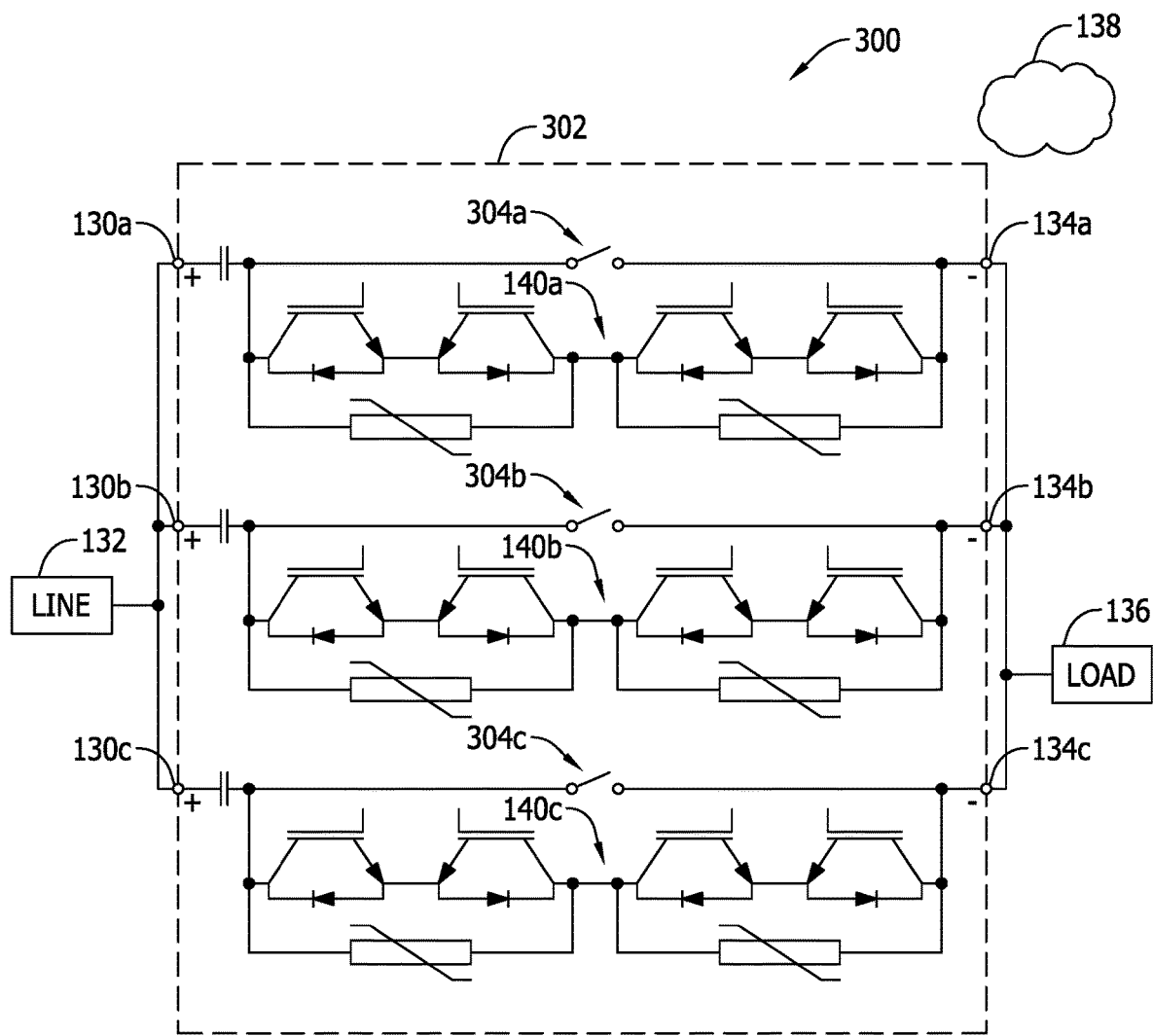
FIG. 9 is a simplified schematic diagram of the circuit protection device shown in FIG. 8 in an exemplary hybrid configuration.

FIG. 9 is a simplified schematic diagram of the circuit protection device 130 in an exemplary hybrid configuration. The device 300 includes input terminals 130a, 130b, 130c each connected to one phase of a three-phase power supply indicated as line-side circuitry 132 via connecting cables or conduits. The device 300 further includes output terminals 134a, 134b, 136c each connected to load-side circuitry 136 such as motors, fans, lighting devices, and other electrical equipment in an industrial facility wherein ignitable gas, vapors or substances may be airborne as indicated at 138 to produce an explosive environment.

In between each pair of input terminals 130a, 130b, and 130c, and output terminals 134a, 134b, and 136c are mechanical circuit breakers 304a, 304b, and 304c and parallel connected solid-state switch devices arranged as indicated at 140a, 140b and 140c. The exemplary solid-state switch arrangement 140a, 140b, and 140c includes series-connected pairs of insulated-gate bipolar transistors (IGBTs) with each pair including a varistor element connected in parallel to the IGBTs as described above. While exemplary solid-state switching arrangements are shown and described, others are possible to achieve solid-state switching functionality in an arc-less manner. As discussed above, the solid-state switching devices operate in an arc-less manner and therefore do not themselves present a risk of ignition insofar as arcing is concerned in a hazardous location.

The combination of the mechanical circuit breakers 304a, 304b, and 304c and the solid-state switching arrangements 140a, 140b and 140c can improve response times of the device 300 relative to that of the device 100. The mechanical circuit breakers 304a, 304, and 304c however, operate with mechanical switch contacts and accordingly deserve some attention to a hazardous location application as arcing can be an ignition source. The solid-state switching arrangements 140a, 140b and 140c that are connected in parallel to the mechanical circuit breakers 304a, 304b, and 304c can limit the current in mechanical circuit breakers 304a, 304, and 304c in an overload or short circuit event to reduce intensity of any arc produced to a level below that required to present an ignition concern, or otherwise preclude arcing altogether.

The device 300 is likewise connected to an electrical ground 146 to dissipate any charging of the housing surface as described above, thereby precluding a possible ignition source via static discharge as described above. The line and load-side connections may be established using any of the secure terminal assemblies described above, including but not limited to armored cable and cable glands to provide enhanced safety assurance for explosive environments.

In contemplated embodiments, the housing 102 of the device 300 may be fabricated from metallic or non-metallic materials. In some cases involving certain metallic or non-metallic materials, strategic selection of housing materials, filler materials and encapsulant materials is necessary in order to address static electricity concerns. Combinations of conductive and non-conductive materials, both internal to the device 300 and external to the device 300 may be utilized to provide paths to electrical ground as appropriate.

Figure 10:
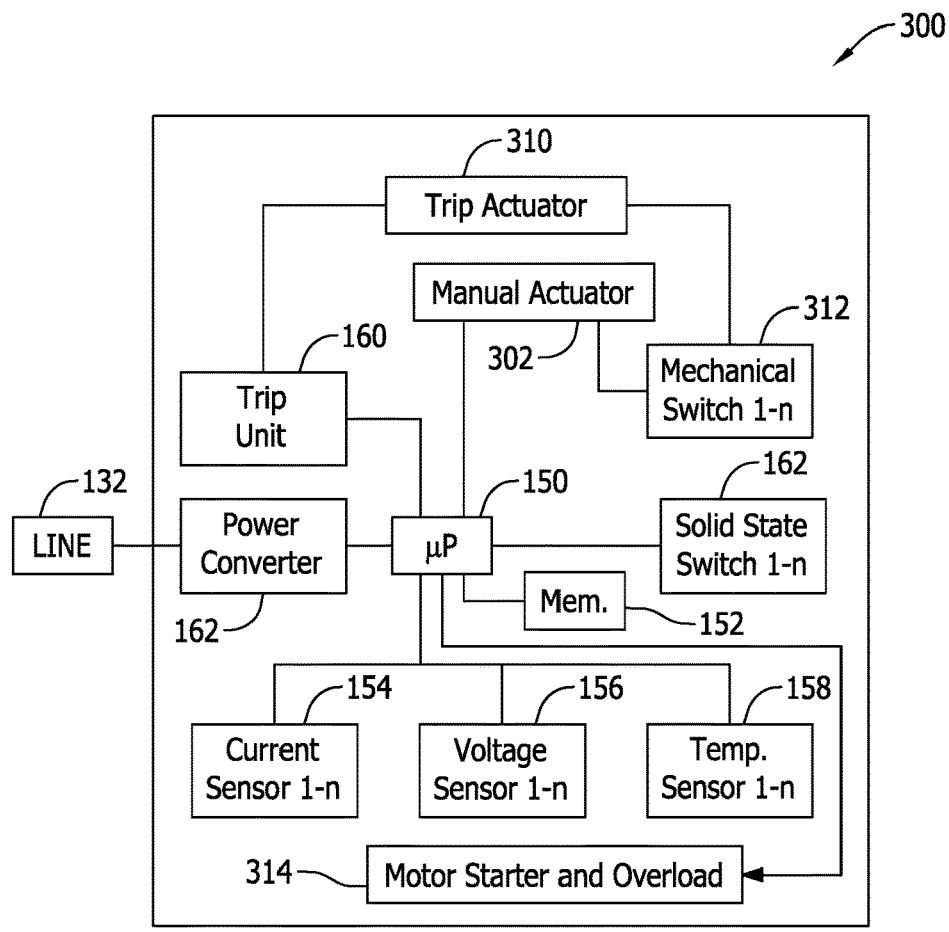
FIG. 10 is a block diagram of the circuit protection device shown in FIGS. 8 and 9.

FIG. 10 is a block diagram of the circuit protection device 300 including, in addition to the elements described above in the device 100, control inputs for the manual actuator 302, and a trip actuator 310 for operating the mechanical circuit breakers 312 including the mechanical switches. When predetermined overcurrent conditions arise, the trip unit 160 causes the trip actuator 310 to displace the movable switch contacts and open the circuit through the device 300. The trip actuator may be an electromagnetic member such as a solenoid that can simultaneously displace the switch contacts of each mechanical breaker provided in the device 300, with the solid-state switching arrangements 140a, 140b and 140c limiting the current as the displacement of the switch contacts occurs. The manual actuator 302 can thereafter be used to reset the device 300 by closing the mechanical switches.

While an exemplary device architecture has been described for the device 300, it is understood that certain of the elements shown in FIG. 10 may be considered optional to provide more basic functionality, as well as additional elements could be added to realize still further sophistication and intelligence in the operation of the device 300.

Figure 11:
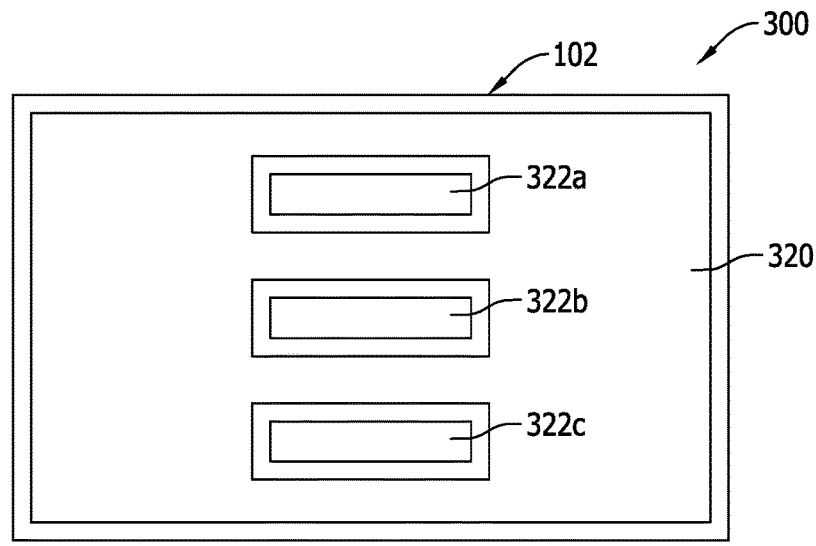
FIG. 11 diagrammatically illustrates thermal management features for the circuit protection device shown in FIGS. 8 through 10.

FIG. 11 diagrammatically illustrates thermal management features for the circuit protection device shown in FIGS. 8 through 10. While as described above the hybrid device 300 is capable of operating in an arc-less manner in many instances, since arcing can depend on the nature of an electrical fault and the voltage and current of the operating power system at the time of the electrical fault, additional considerations to address any arcing that is realized must be considered.

As shown in FIG. 11, and in addition to the thermal management features described above in relation to the device 100, the device 300 includes additional features to ensure that any arcing that occurs in operation of the mechanical circuit breakers is isolated from the ambient environment or otherwise is reduced to a level that is insufficient to cause ignition in an explosive location. FIG. 11 illustrates the housing 102 of the device 300 defining a first or primary enclosure 320 and a series of secondary enclosures 322a, 322b, and 322c. The secondary enclosures 322 serve to contain any electrical arcing within the secondary enclosure while ensuring that airborne ignitable gases, vapors or substances cannot reach the secondary enclosures 322a, 322b, and 322c and therefore cannot be ignited by operation of the mechanical circuit breakers.

In contemplated embodiments, the secondary enclosures 322a, 322b, and 322c may be hermetically-sealed chambers that include the respective switch contacts. The hermetically-sealed chambers 322a, 322b, and 322c are fluid tight such that any ignitable element of the hazardous location that may penetrate the housing 102 into the primary enclosure 102 cannot enter the sealed chambers 322a, 322b, and 322c. The hermetically-sealed chambers may further be vacuum chambers or filled with inert gas that would reduce arcing intensity and duration, if not avoiding arcing altogether as the switch contacts are opened and closed. Each of the secondary enclosures 322a, 322b, and 322c may be provided with additional insulation and material to contain any heat associated with arcing and localize it to the secondary enclosures 322a, 322b, and 322c inside the larger enclosure 320. The enclosure within an enclosure construction of the housing 102 accommodates the other thermal management features described above, while addressing the additional concerns of the mechanical switch contacts in the explosive environment.

The secondary enclosures 322a, 322b, and 322c may be fabricated from different materials than the rest of the housing 102, or a combination of materials that may be the same or different from the remainder of the housing. Metal and plastic materials may be utilized, for example, to construct the chambers while the primary enclosure and the rest of the housing may be entirely plastic. Numerous variations are possible in this regard. The secondary enclosures 322a, 322b, and 322c may be prefabricated for assembly with the housing 102 at a separate stage of manufacture. The secondary enclosures 322a, 322b, and 322c may enclose some or all of the mechanical circuit breaker mechanism, without impeding the path of motion of the switch contacts or their ability to move.

Each of the devices 100 or 300 may be safely used in IEC Zone 1 or 2 and NEC Division 1 hazardous locations, without conventional, separately provided explosion-proof enclosures, and the enhanced safety features concerning wiring limits and fail-safe operation and intelligent diagnosis and management of issues as described above in relation to the device 100 apply equally to the device 300. The built-in ignition protection features described above either eliminate ignition sources or reduce them levels that are insufficient to cause ignition. The devices 100 or 300 are therefore sometimes referred to as being ignition-protected and therefor eliminate any need for a separately provided explosion-proof enclosure. As such, the devices 100 and 300 prevent the possible explosion that the explosion-proof enclosure conventionally exists to safely contain. The devices 100 and 300 can accordingly safely operate in explosive locations and obviate costs and burdens of conventional explosion-proof enclosures while saving space in the electrical power system.

Figure 12:
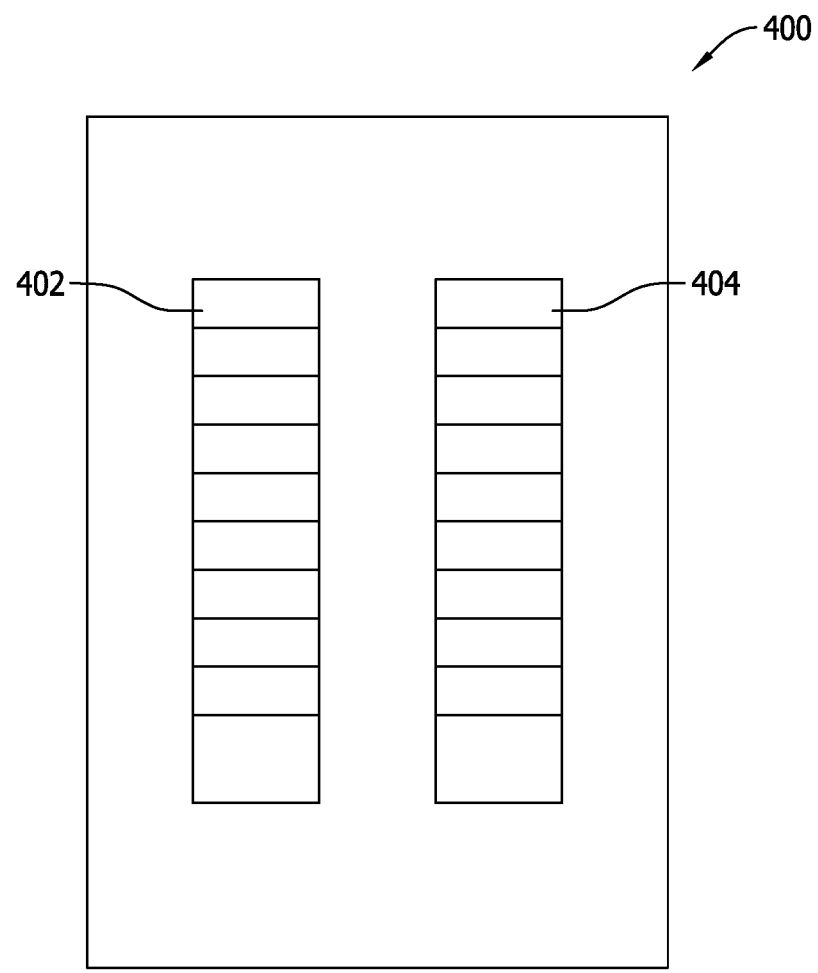
FIG. 12 illustrates an exemplary panelboard including compliant, explosive location circuit protection devices.

FIG. 12 illustrates an exemplary panelboard 400 including compliant, hazardous location circuit protection devices including an array of devices 402, 404 arranged as two columns of devices. The devices 402, 404 in each column include the devices 100 or 300 described above, and the devices 402, 404 may be represented in different ratings offering differing degrees of circuit protection to the various different loads served by the panel and its various branches. The panelboard 400 typically includes its own enclosure, but because of the ignition protected devices described that are utilized on the panelboard it can be a standard enclosure that is not designed to be explosion-proof. Because the devices 402, 404 are ignition protected, they can reside in the panel enclosure without conventional explosion-proof enclosures in the panel enclosure either. The panel enclosure provides some protection to the devices 402, 404 from environmental conditions, but no-explosion-proofing is needed by virtue of the ignition-protected devices 402, 404. Considering that known panelboards may accommodate up to 84 devices, elimination of the separately provided individual and collective explosion-proof enclosures lowers costs substantially for operation of the devices 402, 404 in hazardous locations. The costs are multiplied even further for large electrical power systems including a number of panelboards located at different locations.

The thermal management concerns are multiplied in such a panelboard installation including numerous devices 402, 404 operating simultaneously and in close proximity to one another. Heat effects can accumulate and adjacent devices may run hotter (i.e., with higher surface temperatures) than they would if used individually, or at least spaced farther apart from one another. The devices 402, 404 in the upper portions of the columns may further run hotter than devices 402, 404 in the lower portions of the disclosure as the heat rises from the lower situated devices 402, 404. In some instances then, active cooling features and systems may be advisable to avoid undesirable temperature effects on the operation some of the devices 402, 404 or to address elevated surface temperatures. As mentioned above, an active cooling system could be provided on or in relation to the panelboard to cool devices 402, 404 at a systems level, as opposed to individually. Variations and combinations of active cooling elements and systems are possible to achieve different cooling effects. The active cooling system could be triggered by ambient temperate sensing, evaluation of wiring limits or terminal temperatures, etc. as described above.

While a panelboard and panelboard enclosure are described above for the devices 402, 404, similar benefits may be realized in motor control centers and other locations in an electrical power system wherein circuit protection devices 402, 404 are likewise conventionally located in non-explosion-proof enclosures. Considering the sensors and intelligence provided in the devices 402, 404 and motor-inrush features provided in the devices 402, 404 additional motor startup components could be integrated in the design of the devices 402, 404 and provide a combination circuit protector/motor starter in a single package, as opposed to conventionally provided, separately packaged and series connected circuit protectors and motor starter assemblies that each require explosion-proof enclosures for use in hazardous locations. In this context the motor circuit protection could be automatically programmed based on input of the motor ratings (FLA or perhaps just the model number, which would provide the FLA for example) and wire sizes.

While a combination circuit protector/motor starter has been described, other dual purpose or dual function devices 402, 404 are likewise possible that reduce costs of installing and servicing electrical power systems even further by reducing the number of devices that need to be acquired, installed, and serviced in the power system.

Figure 13:
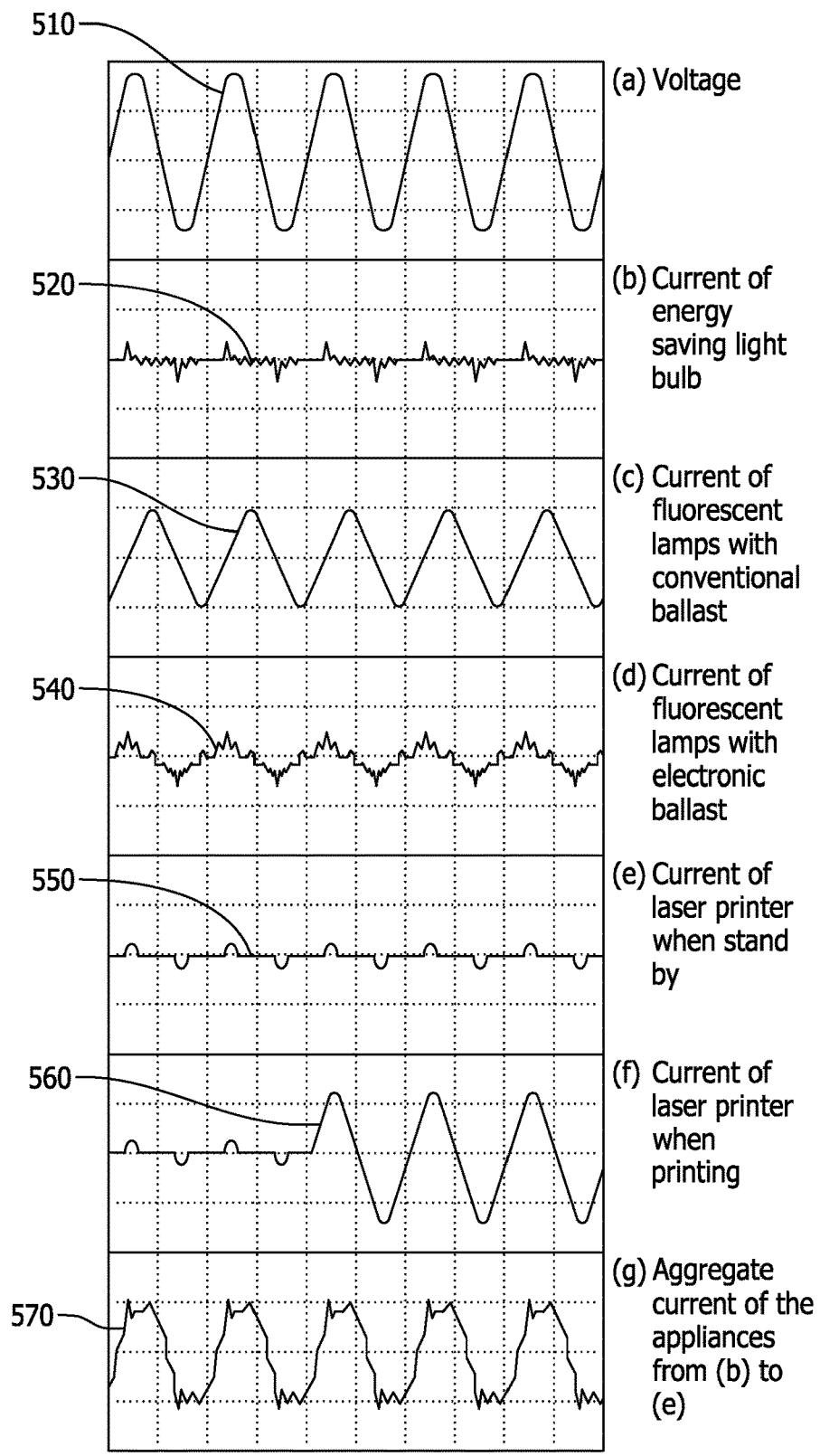
FIG. 13 illustrates exemplary waveforms of power supply voltage and current waveform signatures of various different electrical loads that may be detected and managed with exemplary embodiments of compliant, hazardous location arc-less circuit protection devices of the invention.

FIG. 13 illustrates exemplary waveforms of power supply voltage and current waveform signatures of various different electrical loads that may be detected and managed with compliant, hazardous location arc-less circuit protection devices such as the devices 100 and 300 described above. Such current signature detection and management may be implemented algorithmically in the controls of the device 100 or 300 to complement the features described above concerning detection of wiring limits and the like and provide further ability to proactively manage risks in the operation of the electrical power system in a hazardous environment.

At the top of FIG. 13, a voltage input plot 510 is shown which represents the power supply or line-side circuitry connected to the line-side terminals of a device 100 or 300. The plot 510 may be recognized as corresponding to an alternating current (AC) power supply. In the absence of a predefined overcurrent condition, the device 100 or 300 conducts current to the loads connected to the load side-terminals of the device 100 or 300. Different loads connected to the same device 100 or 300 draw different currents, however, that may be distinguished from one another.

For example, waveform 520 represents exemplary current draw by an energy saving light bulb that may be protected by the device 100 or 300, while waveform 530 represents exemplary current draw by a fluorescent lamp having a conventional ballast that may be protected by the device 100 or 300 and waveform 540 represents exemplary current draw by a fluorescent lamp having an electronic ballast. The waveforms 520, 530, and 540 are markedly different from one another, providing the ability of the device 100 or 300 to identify particular types of loads and changes in the loads over time.

As further examples, waveforms 550 and 560 represent exemplary current draw by a laser printer in a stand by state and when actually operating to print a document. The waveforms 550 and 560 are markedly different from one another, providing the ability of the device 100 or 300 to identify status of connected loads (e.g., standby or non-standby) and also changes in current draw associated with the status of the loads over time. It is also seen that the waveforms 550 and 560 are markedly different from the waveforms 520, 530 and 540.

The exemplary waveform 570 is the aggregate of the waveforms 520, 530, 540, 550 and 560. As such, waveform 570 represents a plurality of the loads being protected through a device 100 or 300 and simultaneously drawing current from the power supply input voltage 510. The waveform 570 is seen to be markedly different from the individual waveforms 520, 530, 540, 550 and 560, providing the ability of the device 100 or 300 monitor the operation of the loads and detect changes in operation of the loads over time. Such differences in the waveforms, either individually or in the aggregate, present unique identifying signatures that allow a device 100 to intelligently self-configure itself for optimal operation with a connected load.

For example, a detection of a unique current signature of a connected load may inform the device 100 or 300 is associated with an in-rush current upon a starting event, and the device 100 or 300 can accordingly self-select a mode of operation that provides the desired circuit protection, while tolerating the in-rush current of a connected load. Unique signatures may be input to a device 100 or 300, either locally or remotely or via initial programming of the device controls, to allow such automated, self-configuration of the device when detected loads are connected.

Such self-configurability may be ideal for portable power applications where device 100 or 300 may be fixed but the connected load(s) may vary over time. In a contemplated example, a lighting element may be temporarily connected to a device 100 or 300 and after the lighting element is no longer connected another load such as a motor or a piece of welding equipment may be temporarily connected to the device 100 or 300. In each case, the device 100 or 300 may automatically adjust its time-current characteristics to optimize its use with the detected loads. Additionally or alternatively, input selections may be made locally or remotely to set the device 100 or 300 to a desired setting for load, and the intelligent device 100 or 300 can compare any input setting to the detected signature of a load that the device 100 or 300 may independently verify and confirm. Error conditions may therefore be detected and managed for any incompatibility in manually selected device settings and connected loads. The management of detected error conditions may including rejection of user-selected settings, generation of notification or alerts, or the device 100 or 300 reverting to fail-safe measures by limiting current or taking other desired measures to ensure safety in the hazardous location.

Differences in the current waveforms and signatures of the loads, either individually or in the aggregate, that can be detected in the devices 100 and 300 further allows for enhanced intelligence and capability to monitor the larger electrical system to which devices 100 or 300 are connected. To the extent that detected changes in the unique current signatures may deviate from normal, expected signatures of the connected loads, proactive measures may be initiated by the device 100 or 300 to avoid adverse consequences.

For example, such proactive measures that may be implemented algorithmically in the controls of the device 100 or 300, may include, but are not limited to generating notifications or alerts to responsible personnel to investigate possible issues with connected loads, limiting current through the device 100 or 300 to reduce ignition risks in a hazardous location by overheating of one or more of the loads, ceasing current flow through the device 100 or 300 altogether, and communicating or messaging to upstream or downstream circuit protection devices (which may include additional devices 100 or 300) of detected issues so the upstream or downstream devices may themselves take proactive or corrective measures. Intelligent devices upstream and downstream of a particular device 100 or 300 may also confirm that operating temperatures of the loads and other parameters of interest are below the corresponding safety limits for a hazardous location, and notifications and alerts may be escalated or de-escalated as needed.

Additionally, error conditions can be identified via communication between intelligent devices 100 and 300. For example, in the case of series connected devices 100 or 300, if the upstream device indicates a problematic load-side signature, but the downstream device does not, it may be inferred that one of the two series connected device is malfunctioning, and a notification or alert can be generated to investigate and take corrective measures. Confirmation of detected conditions by upstream and downstream devices may confirm a proper operation of each device, while discrepancies can reveal error conditions that would otherwise not by apparent to power system overseers. Current signature detection and monitoring, and also comparison of detected signatures to those made by other devices, may therefore intelligently serve as health check assessments of the devices 100 or 300 themselves, in addition to the larger electrical system to ensure a safe operation of the power system in the hazardous location. Cascading, emergency shut-down procedures are possible with advance warning capability to manage risks in hazardous locations.

Figure 14:
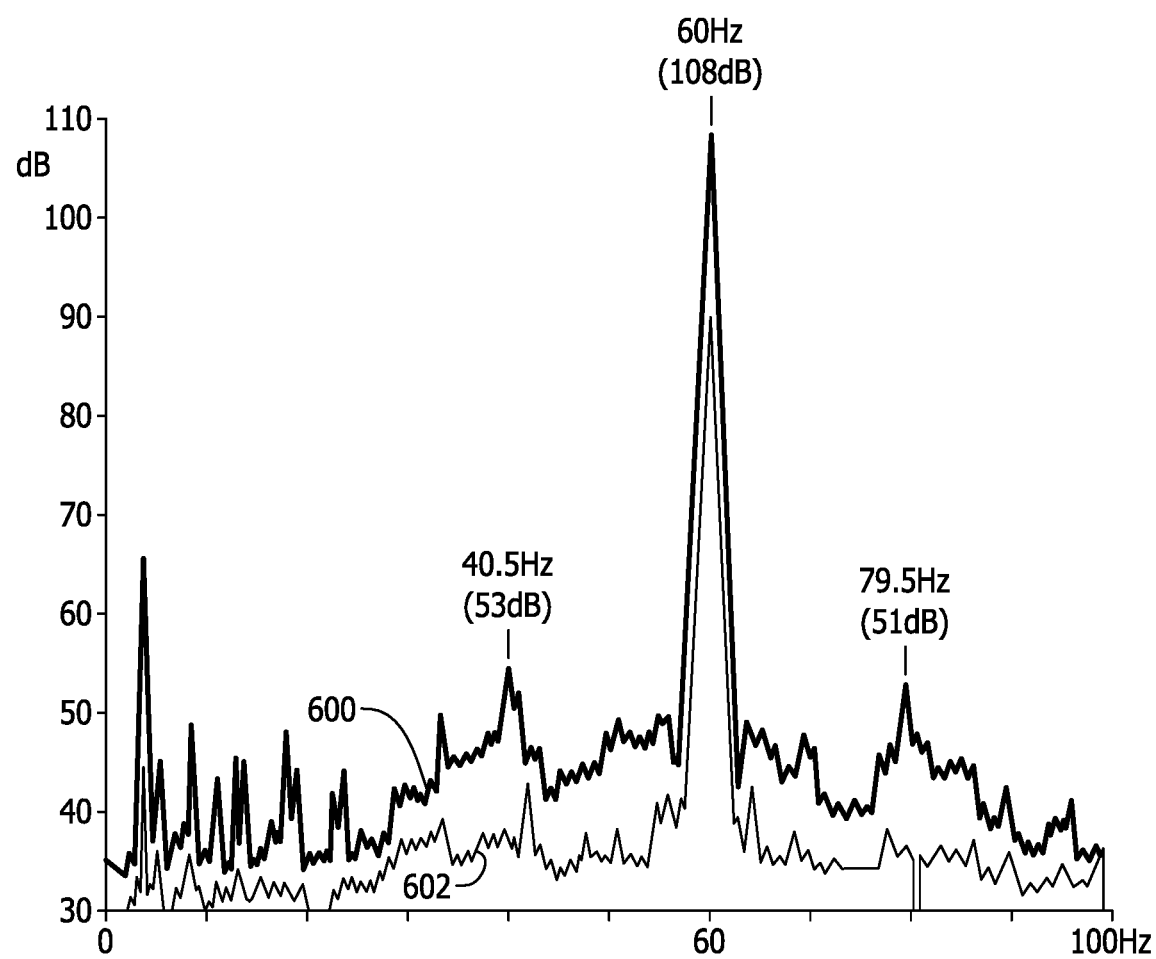
FIG. 14 illustrates an exemplary current signature change in protected load circuitry that may be detected and managed with exemplary embodiments of compliant, hazardous location arc-less circuit protection devices of the invention.

FIG. 14 illustrates an exemplary current signature change in protected load circuitry of a device 100 or 300 that may be detected and managed with further benefits. Specifically, FIG. 14 shows first and second waveforms 600, 602 over an elapsed time period. As the load operates over time, the current signature may change as the components in certain loads (e.g., pumps or motors) tend to mechanically and electrically wear out over the working life of the load. The device 100 or 300 that detects a predetermined amount of change can therefore initiate a notification or alert to power system personnel in advance of possible equipment failure at the end of service life. Proactive management of the power system to manage ignition risks in a hazardous location, as well as to avoid unexpected disruption and system downtime due to foreseeable events given the monitoring and intelligence capability of the device 100 or 300 is therefore possible.

Also, unexpected changes in a detected load may afford proactive management or response of user error in connecting a load to a device 100 or 300. For example, and in the portable power application scenario described above, a user may inadvertently connect a device or load that is incompatible with or unapproved for use with the device 100 or 300. The device 100 or 300 can then undertake fail-safe modes of operation or shut-down procedures to avoid adverse consequence, as well as provide notifications or alerts so that the incompatible or unapproved device may be removed.

The solid state or hybrid devices such as those described above may be constructed using various different solid state switching elements, arrangements of solid state switching elements, and also implemented in various different power electronics topologies. Various different embodiments are contemplated involving varying degrees of on-state loss, propensity to arcing in operation, conduction loss, component count, relative complexity, ability to meet specific response time characteristics, simplicity or complexity of operating algorithms, and ability to integrate motor soft-starting or other features when desired. Solid state switching elements can be connected in series or in parallel to achieve desirable voltage rating scaling or desirable current rating scaling using modular arrangements. To the extent that by-pass contacts are desirably implemented, encapsulation materials and thermal management features for the by-pass contact(s) provided may be advisable.

Any of the solid state and hybrid switch arrangements shown and described above may include or be connected to line-side electrical fuses to enhance circuit protection assurance by addressing any deficiency of the solid state switching elements with respect to certain overcurrent conditions or to improve response times to certain operating conditions.

The chemical and impact resistance housing construction, arc-free operation, secure terminal assemblies and advanced intelligence and thermal management features described above can easily be applied to realize circuit protection devices that are not circuit breaker devices, but are nonetheless ignition protected for use in NEC Division 1 or 2 hazardous locations, as well as IEC Zone 1 or 2 locations, without separate explosion-proof enclosures. For example fusible switch disconnect devices are discussed above that include mechanical switches in combination with fuses. Applying the chemical and impact resistant housing constructions, arc-free switching operation, secure terminal assemblies and thermal management features described, a solid-state fusible switch disconnect device or a hybrid fusible switch disconnect device can easily be constructed with similar benefits, but offering a different degree of circuit protection.

Likewise, the chemical and impact resistant housing construction, arc-free switching operation, secure terminal assemblies and certain of the intelligence and thermal management features described above can easily be applied to realize switching devices that do not themselves provide circuit protection, but are nonetheless ignition protected for use in NEC Division 1 or 2 hazardous locations or IEC Zone 1 locations, without explosion-proof enclosures. For example, mechanical relay switches and contactors are known that provide disconnection functionality without capability to protect against overcurrent conditions. Applying the chemical and impact resistant housing construction, arc-free switching operation, secure terminal assemblies and thermal management features described, a solid-state relay device or a hybrid relay device, and a solid-state contactor device or a hybrid contactor device can easily be constructed for safe operation in an explosive environment with intelligent detection of wiring limits and loose connections to realize at least some of the benefits described above.

Ignition protected devices such as those described can be provided with any desired number of switching poles, including for example only single pole devices, two pole devices, three pole devices, and four pole devices to accommodate the needs of any type of power system, including multiphase power systems and polyphase power systems, while universally providing ignition protection for use in NEC Division 1 or 2 or IEC Zone 1 or 2 hazardous locations.

Having described devices and applicable operating algorithms functionally per the description above, those in the art may accordingly implement the algorithms via programming of the controllers or other processor-based devices. Such programming or implementation of the algorithmic concepts described is believed to be within the purview of those in the art and will not be described further.

The benefits and advantages of the inventive concepts are now believed to have been amply illustrated in relation to the exemplary embodiments disclosed.

An embodiment of a configurable and compliant circuit protection system for an explosive environment has been disclosed. The system includes at least one switch device comprising a housing, a line-side terminal and a load-side terminal coupled to the housing, a bus structure in the housing and including at least one solid state switching element operable in an arc-free manner to connect the load-side terminal to the line-side terminal and disconnect the load-side terminal from the line-side terminal, and a controller configured to: receive a selected one of a plurality of different settings for operation of the at least one solid state switching element to protect a connected electrical load; and determine whether the received setting exceeds a wiring limit for the explosive environment; whereby the switch device is compliant for use in the explosive environment without requiring a separately provided explosion-proof enclosure.

Optionally, the controller is further configured to determine the wiring limit. The controller may also be configured to compare the accepted wiring limit and the determined wiring limit. The controller may be configured to determine a wire gauge for a connection made to the line-side terminal and a load-side terminal. The controller is configured to determine the wire gauge according to a position of a fastener that completes a connection to the line-side or load-side terminal.

The controller may be configured to accept a temperature input, and based on the temperature input the controller is configured to determine whether a wiring limit has been exceeded. The controller may be configured to operate the at least one solid state switching element in response to the temperature input to maintain a surface temperature of the housing at or below a rated temperature for the explosive environment, thereby precluding the housing from being an ignition source in the explosive environment.

The controller may be configured to communicate the accepted setting to at least one other switch device in a network of switch devices. The controller may be configured to identify an error in the wiring connected to the line-side or load-side terminal, and generate notification or alert of the identified error. The controller may be configured to accept the received setting only when the wiring limit is not exceeded, and control the at least one solid state switching element according to the accepted setting. The controller may alternatively be configured to reject the received setting when the wiring limit is exceeded, and prompt a selection of an alternative one of the plurality of settings. The controller may be configured to enable a fail-safe mode when the received setting exceeds the wiring limit.

The controller may be configured to detect a unique current signature of at least one connected load, monitor a change in the unique current signature over time; and generate a notice or alert based on the monitored change in the unique current signature. The controller may be configured to automatically select one of the plurality of different settings based on the detected unique current signature.

The at least one switch device may also include at least one mechanical switch contact in the bus structure, with the housing including a sealed internal enclosure containing the at least one mechanical switch contact, thereby precluding the switch contact from being an ignition source in the explosive environment. The at least one solid state switching element may be encapsulated.

The at least one switching device may be configured as a solid state circuit breaker, or may be configured as a hybrid circuit breaker. The housing may be chemically resistant to elements in the hazardous location.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A controller including a processor and a memory accessible by the processor, the memory storing instructions that when executed by the processor implement a method, comprising:
   receiving a selected one of a plurality of different settings for operation of at least one solid state switching element to protect a connected electrical load;
   determining whether the received selected one of the plurality of different settings exceeds a wiring limit for an explosive environment in which the solid state switching element is situated;
   accepting a temperature input; and
   outputting control signals to operate the at least one solid state switching element in response to the temperature input to maintain a surface temperature of a housing containing the at least one solid state switching element at or below a rated temperature for the explosive environment, thereby precluding the housing from being an ignition source in the explosive environment.

2. The controller of claim 1, wherein the implemented method further comprises receiving a wiring limit for the explosive environment.

3. The controller of claim 2, wherein the implemented method further comprises accepting a wiring ampacity limit for a line-side or a load-side wiring at a location of the at least one switch device in a power system, and comparing the accepted wiring ampacity limit and the wiring limit for the explosive environment.

4. The controller of claim 2, wherein the controller is further configured to determine a wire gauge for a connection made to the line-side terminal and the load-side terminal.

5. The controller of claim 4, wherein the controller is configured to determine the wire gauge according to a position of a fastener that completes the connection to the line-side or load-side terminal.

6. The controller of claim 1, wherein the controller is further configured to communicate the selected one of the plurality of different settings to at least one other switch device in a network of switch devices.

7. The controller of claim 1, wherein the controller is further configured to identify an error in a wiring connection of the connected electrical load, and generate a notification or alert for the identified error.

8. The controller of claim 1, wherein the controller is further configured to:
   accept the selected one of the plurality of different settings only when the wiring limit is not exceeded; and
   control the at least one solid state switching element according to the accepted setting.

9. The controller of claim 1, wherein the controller is further configured to:
   reject the selected one of the plurality of different settings when the wiring limit is exceeded; and
   prompt a selection of an alternative one of the plurality of settings.

10. The controller of claim 1, wherein the controller is further configured to:
    enable a fail-safe mode when the received setting exceeds the wiring limit.

11. The controller of claim 1, wherein the controller is configured to detect a unique current signature of at least one connected load.

12. The controller of claim 11, wherein the controller is further configured to:
    monitor a change in the unique current signature over time; and
    generate a notice or alert based on the monitored change in the unique current signature.

13. The controller of claim 11, wherein the controller is further configured to automatically select one of the plurality of different settings based on the detected unique current signature.

14. The method of claim 1, further comprising identifying an error in wiring connected to the line-side or load-side terminal, and generating a notification or alert for the identified error.

15. The method of claim 1, further comprising detecting a unique current signature of at least one connected load.

16. The method of claim 15, further comprising selecting one of the plurality of different settings based on the detected unique current signature.

17. A method, comprising:
    providing a bus structure including at least one solid state switching element that is operable in an arc-free manner to connect a load-side terminal to a line-side terminal and disconnect the load-side terminal from the line-side terminal, wherein the bus structure is located in a housing and the load-side terminal and the line-side terminal are coupled to the housing;
    receiving a selected one of a plurality of different settings for operation of the at least one solid state switching element to protect a connected electrical load;
    determining whether the received selected one of the plurality of different settings exceeds a wiring limit for an explosive environment;
    accepting a temperature input; and
    operating the at least one solid state switching element in response to the temperature input to maintain a surface temperature of the housing at or below a rated temperature for the explosive environment, thereby precluding the housing from being an ignition source in the explosive environment.

18. The method of claim 17, further comprising determining a wiring limit for the explosive environment.

19. The method of claim 18, further comprising accepting a wiring ampacity limit for a line-side or load-side wiring at a location of the at least one switch device in a power system, and comparing the accepted wiring ampacity limit and the determined wiring limit for the explosive environment.

20. The method of claim 18, further comprising determining a wire gauge for a connection made to the line-side terminal and the load-side terminal.

* * * * *